United States Patent
Brendes et al.

(10) Patent No.: US 8,224,928 B2
(45) Date of Patent: Jul. 17, 2012

(54) METHODS AND SYSTEMS FOR DISTRIBUTING OPERATING STATUS INFORMATION WITHIN A CONVERGED NETWORK

(75) Inventors: Dan Alan Brendes, Raleigh, NC (US); Joseph William Keller, Cary, NC (US); Seetharaman Khadri, Durham, NC (US)

(73) Assignee: Tekelec, Inc., Morrisville, NC (US)

( * ) Notice: Subject to any disclaimer, the term of this patent is extended or adjusted under 35 U.S.C. 154(b) by 1005 days.

(21) Appl. No.: 11/986,500

(22) Filed: Nov. 21, 2007

(65) Prior Publication Data

US 2008/0075068 A1    Mar. 27, 2008

Related U.S. Application Data

(62) Division of application No. 09/770,316, filed on Jan. 26, 2001, now Pat. No. 7,318,091.

(60) Provisional application No. 60/208,523, filed on Jun. 1, 2000.

(51) Int. Cl.
    *G06F 13/00* (2006.01)
(52) U.S. Cl. ........................................ 709/219
(58) Field of Classification Search .................... 709/219
    See application file for complete search history.

(56) References Cited

U.S. PATENT DOCUMENTS

| | | |
|---|---|---|
| 4,949,299 A | 8/1990 | Pickett |
| 5,008,929 A | 4/1991 | Olsen et al. |
| 5,142,622 A | 8/1992 | Owens |
| 5,173,897 A | 12/1992 | Schrodi et al. |
| 5,208,811 A | 5/1993 | Kashio et al. |
| 5,239,542 A | 8/1993 | Breidenstein et al. |
| 5,315,641 A | 5/1994 | Montgomery et al. |
| 5,384,840 A | 1/1995 | Blatchford et al. |
| 5,420,916 A | 5/1995 | Sekiguchi |
| 5,430,727 A | 7/1995 | Callon |
| 5,477,531 A | 12/1995 | McKee et al. |
| 5,481,673 A | 1/1996 | Michelson |
| 5,509,010 A | 4/1996 | La Porta et al. |
| 5,537,461 A | 7/1996 | Bridges et al. |

(Continued)

FOREIGN PATENT DOCUMENTS

CA    2239764    12/1998

(Continued)

OTHER PUBLICATIONS

Notice of Allowance and Fee(s) Due for U.S. Appl. No. 11/184,439 (Dec. 29, 2008).

(Continued)

*Primary Examiner* — Robert B Harrell
(74) *Attorney, Agent, or Firm* — Jenkins, Wilson, Taylor & Hunt, P.A.

(57) ABSTRACT

Disclosed is a communications network element that is capable of routing signaling messages and also performing inter-network management functions in a converged telephony-data network environment. A signaling gateway routing node is adapted to facilitate signaling communication between nodes in a signaling system 7 network and nodes in an Internet protocol (IP) type network. In addition to basic message routing functionality, the signaling gateway routing node is adapted to notify nodes in the IP network when a node in the SS7 network becomes congested or unavailable. In certain cases, the signaling gateway selectively notifies only IP nodes that are concerned with the status of the troubled SS7 node, while in other cases, notification messages are broadcast to all relevant IP nodes. The signaling gateway also serves to filter redundant congestion status queries or polling type messages that are conveyed from IP nodes through to the distressed SS7 node.

19 Claims, 17 Drawing Sheets

U.S. PATENT DOCUMENTS

| | | | |
|---|---|---|---|
| 5,568,487 A | 10/1996 | Sitbon et al. |
| 5,581,558 A | 12/1996 | Horney, II et al. |
| 5,583,926 A | 12/1996 | Venier et al. |
| 5,583,927 A | 12/1996 | Ely et al. |
| 5,586,177 A | 12/1996 | Farris et al. |
| 5,592,530 A | 1/1997 | Brockman et al. |
| 5,610,910 A | 3/1997 | Focsaneanu et al. |
| 5,612,949 A | 3/1997 | Bennett |
| 5,638,431 A | 6/1997 | Everett et al. |
| 5,640,446 A | 6/1997 | Everett et al. |
| 5,650,998 A | 7/1997 | Angenot et al. |
| 5,651,002 A | 7/1997 | Van Seters et al. |
| 5,657,452 A | 8/1997 | Kralowetz et al. |
| 5,661,790 A | 8/1997 | Hsu |
| 5,664,102 A | 9/1997 | Faynberg |
| 5,675,635 A | 10/1997 | Vos et al. |
| 5,680,437 A | 10/1997 | Segal |
| 5,680,552 A | 10/1997 | Netravali et al. |
| 5,694,463 A | 12/1997 | Christie et al. |
| 5,696,809 A | 12/1997 | Voit |
| 5,701,301 A | 12/1997 | Weisser, Jr. |
| 5,706,286 A | 1/1998 | Reiman et al. |
| 5,712,903 A | 1/1998 | Bartholomew et al. |
| 5,732,213 A | 3/1998 | Gessel et al. |
| 5,740,374 A | 4/1998 | Raffali-Schreinemachers |
| 5,754,752 A | 5/1998 | Sheh et al. |
| 5,761,281 A | 6/1998 | Baum et al. |
| 5,761,290 A | 6/1998 | Farris et al. |
| 5,761,500 A | 6/1998 | Gallant et al. |
| 5,764,750 A | 6/1998 | Chau et al. |
| 5,764,955 A | 6/1998 | Doolan |
| 5,768,361 A | 6/1998 | Cowgill |
| 5,768,525 A | 6/1998 | Kralowetz et al. |
| 5,774,695 A | 6/1998 | Autrey et al. |
| 5,781,534 A | 7/1998 | Perlman et al. |
| 5,787,255 A | 7/1998 | Parlan et al. |
| 5,793,425 A | 8/1998 | Balakrishnan |
| 5,793,771 A | 8/1998 | Darland et al. |
| 5,802,285 A | 9/1998 | Hirviniemi |
| 5,805,587 A | 9/1998 | Norris et al. |
| 5,809,028 A | 9/1998 | Nethercott et al. |
| 5,812,639 A | 9/1998 | Bartholomew et al. |
| 5,812,669 A | 9/1998 | Jenkins et al. |
| 5,812,781 A | 9/1998 | Fahlman et al. |
| 5,815,669 A | 9/1998 | Lee et al. |
| 5,828,844 A | 10/1998 | Civanlar et al. |
| 5,838,782 A | 11/1998 | Lindquist |
| 5,852,660 A | 12/1998 | Lindquist et al. |
| 5,867,495 A | 2/1999 | Elliott et al. |
| 5,870,565 A | 2/1999 | Glitho |
| 5,872,782 A | 2/1999 | Dendi |
| 5,878,129 A | 3/1999 | Figurski et al. |
| 5,889,954 A | 3/1999 | Gessel et al. |
| 5,892,822 A | 4/1999 | Gottlieb et al. |
| 5,898,667 A | 4/1999 | Longfield et al. |
| 5,903,636 A | 5/1999 | Malik |
| 5,905,724 A | 5/1999 | Carson et al. |
| 5,912,887 A | 6/1999 | Sehgal |
| 5,917,900 A | 6/1999 | Allison et al. |
| 5,920,562 A | 7/1999 | Christie et al. |
| 5,923,659 A | 7/1999 | Curry et al. |
| 5,926,482 A | 7/1999 | Christie et al. |
| 5,933,490 A | 8/1999 | White et al. |
| 5,940,598 A | 8/1999 | Strauss et al. |
| 5,949,865 A | 9/1999 | Fusinato |
| 5,949,871 A | 9/1999 | Kabay et al. |
| 5,958,016 A | 9/1999 | Chang et al. |
| 5,966,431 A | 10/1999 | Reiman et al. |
| 5,971,900 A | 10/1999 | Miller |
| 5,974,052 A | 10/1999 | Johnson et al. |
| 5,991,301 A | 11/1999 | Christie |
| 5,995,608 A | 11/1999 | Detampel, Jr. et al. |
| 6,002,754 A | 12/1999 | Jaiswal et al. |
| 6,006,098 A | 12/1999 | Rathnasabapathy et al. |
| 6,011,780 A | 1/2000 | Vaman et al. |
| 6,011,794 A | 1/2000 | Mordowitz et al. |
| 6,011,803 A | 1/2000 | Bicknell et al. |
| 6,014,379 A | 1/2000 | White et al. |
| 6,018,515 A | 1/2000 | Sorber |
| 6,021,126 A | 2/2000 | White et al. |
| 6,023,502 A | 2/2000 | Bouanaka et al. |
| 6,026,091 A | 2/2000 | Christie et al. |
| 6,028,921 A | 2/2000 | Malik et al. |
| 6,035,020 A | 3/2000 | Weinstein et al. |
| 6,047,005 A | 4/2000 | Sherman et al. |
| 6,055,202 A | 4/2000 | Merritt |
| 6,055,302 A | 4/2000 | Schmersel et al. |
| 6,061,364 A | 5/2000 | Hager et al. |
| 6,064,653 A | 5/2000 | Farris |
| 6,067,546 A | 5/2000 | Lund |
| 6,069,890 A | 5/2000 | White et al. |
| 6,075,783 A | 6/2000 | Voit |
| 6,078,582 A | 6/2000 | Curry et al. |
| 6,079,036 A | 6/2000 | Moharram |
| 6,081,589 A | 6/2000 | Jiang et al. |
| 6,084,892 A | 7/2000 | Benash et al. |
| 6,084,956 A | 7/2000 | Turner et al. |
| 6,094,437 A | 7/2000 | Loehndorf, Jr. et al. |
| 6,097,036 A | 8/2000 | Teshima et al. |
| 6,097,719 A | 8/2000 | Benash et al. |
| 6,097,805 A | 8/2000 | Figurski et al. |
| 6,111,780 A | 8/2000 | Bertin |
| 6,111,870 A | 8/2000 | Kurtz |
| 6,111,893 A | 8/2000 | Volftsun et al. |
| 6,112,090 A | 8/2000 | Valentine |
| 6,115,383 A | 9/2000 | Bell et al. |
| 6,118,779 A | 9/2000 | Madonna |
| 6,118,780 A | 9/2000 | Dunn et al. |
| 6,119,160 A | 9/2000 | Zhang et al. |
| 6,122,255 A | 9/2000 | Bartholomew et al. |
| 6,122,263 A | 9/2000 | Dahlin et al. |
| 6,122,363 A | 9/2000 | Friedlander et al. |
| 6,122,365 A | 9/2000 | Yegoshin |
| 6,125,111 A | 9/2000 | Snow et al. |
| 6,125,177 A | 9/2000 | Whittaker |
| H1880 H | 10/2000 | Vines et al. |
| H1896 H | 10/2000 | Hoffpauir et al. |
| 6,128,379 A | 10/2000 | Smyk |
| 6,134,235 A | 10/2000 | Goldman et al. |
| 6,134,246 A | 10/2000 | Cai et al. |
| 6,137,869 A | 10/2000 | Voit et al. |
| 6,137,874 A | 10/2000 | Brown et al. |
| 6,138,110 A | 10/2000 | Jahn et al. |
| 6,144,667 A | 11/2000 | Doshi et al. |
| 6,144,670 A | 11/2000 | Sponaugle et al. |
| 6,147,999 A | 11/2000 | Honda et al. |
| 6,151,390 A | 11/2000 | Volftsun et al. |
| 6,154,445 A | 11/2000 | Farris et al. |
| 6,154,467 A | 11/2000 | Hager et al. |
| 6,157,710 A | 12/2000 | Figurski et al. |
| 6,167,025 A | 12/2000 | Hsing et al. |
| 6,178,181 B1 | 1/2001 | Glitho |
| 6,189,031 B1 | 2/2001 | Badger et al. |
| 6,192,051 B1 | 2/2001 | Lipman et al. |
| 6,195,425 B1 | 2/2001 | Farris |
| 6,201,804 B1 | 3/2001 | Kikinis |
| 6,208,642 B1 | 3/2001 | Balachandran et al. |
| 6,215,783 B1 | 4/2001 | Neyman |
| 6,236,722 B1 | 5/2001 | Gilbert et al. |
| 6,240,067 B1 | 5/2001 | Sorber |
| 6,278,697 B1 | 8/2001 | Brody et al. |
| 6,285,754 B1 | 9/2001 | Sun et al. |
| 6,292,479 B1 | 9/2001 | Bartholomew et al. |
| 6,298,120 B1 | 10/2001 | Civanlar et al. |
| 6,307,926 B1 | 10/2001 | Barton et al. |
| 6,311,186 B1 | 10/2001 | MeLampy et al. |
| 6,314,290 B1 | 11/2001 | Joshi et al. |
| 6,324,173 B1 | 11/2001 | Deschaine et al. |
| 6,324,183 B1 | 11/2001 | Miller et al. |
| 6,327,258 B1 | 12/2001 | Deschaine et al. |
| 6,327,267 B1 | 12/2001 | Valentine et al. |
| 6,327,350 B1 | 12/2001 | Spangler et al. |
| 6,328,267 B1 | 12/2001 | Mori |
| 6,330,250 B1 | 12/2001 | Curry et al. |
| 6,330,614 B1 | 12/2001 | Aggarwal et al. |
| 6,333,931 B1 | 12/2001 | LaPier et al. |
| 6,335,937 B1 | 1/2002 | Chao et al. |

| | | |
|---|---|---|
| 6,349,099 B1 | 2/2002 | Larikka et al. |
| 6,366,655 B1 | 4/2002 | Book et al. |
| 6,377,799 B1 | 4/2002 | Hameleers et al. |
| 6,385,301 B1 | 5/2002 | Nolting et al. |
| 6,393,022 B1 | 5/2002 | Hewett et al. |
| 6,393,581 B1 | 5/2002 | Friedman et al. |
| 6,400,813 B1 | 6/2002 | Birnhak |
| 6,411,604 B1 | 6/2002 | Brockman et al. |
| 6,411,632 B2 | 6/2002 | Lindgren et al. |
| 6,415,027 B1 | 7/2002 | Malik |
| 6,425,009 B1 | 7/2002 | Parrish et al. |
| 6,430,189 B1 | 8/2002 | Juntumaa et al. |
| 6,442,169 B1 | 8/2002 | Lewis |
| 6,459,697 B1 | 10/2002 | Neyman |
| 6,459,783 B1 | 10/2002 | March et al. |
| 6,483,837 B1 | 11/2002 | Howell et al. |
| 6,483,842 B1 | 11/2002 | Mauger |
| 6,487,286 B1 | 11/2002 | Reaves et al. |
| 6,496,512 B1 | 12/2002 | Medhat |
| 6,501,764 B1 | 12/2002 | Fudatate et al. |
| 6,504,923 B1 | 1/2003 | Swale |
| 6,507,649 B1 | 1/2003 | Tovander |
| 6,515,985 B2 | 2/2003 | Shmulevich et al. |
| 6,515,997 B1 | 2/2003 | Feltner et al. |
| 6,522,667 B1 | 2/2003 | Oda et al. |
| 6,529,524 B1 | 3/2003 | Liao et al. |
| 6,535,599 B1 | 3/2003 | Torrey et al. |
| 6,542,497 B1 | 4/2003 | Curry et al. |
| 6,546,003 B1 | 4/2003 | Farris |
| 6,553,427 B1 | 4/2003 | Chang et al. |
| 6,563,835 B1 | 5/2003 | Chen |
| 6,574,216 B1 | 6/2003 | Farris et al. |
| 6,577,626 B2 | 6/2003 | Christie et al. |
| 6,584,190 B1 | 6/2003 | Bressler |
| 6,594,246 B1 | 7/2003 | Jorgensen |
| 6,594,258 B1 | 7/2003 | Larson et al. |
| 6,611,532 B1 | 8/2003 | Madour et al. |
| 6,611,533 B1 | 8/2003 | Liao et al. |
| 6,625,170 B1 | 9/2003 | Curry et al. |
| 6,625,461 B1 | 9/2003 | Bertacchi |
| 6,631,133 B1 | 10/2003 | Christi et al. |
| 6,636,504 B1 | 10/2003 | Albers et al. |
| 6,668,051 B1 | 12/2003 | Ashdown et al. |
| 6,674,748 B1 | 1/2004 | Dykhuizen et al. |
| 6,678,242 B1 | 1/2004 | Simon |
| 6,680,953 B1 | 1/2004 | Kim |
| 6,681,009 B1 | 1/2004 | Graf et al. |
| 6,683,881 B1 | 1/2004 | Mijares et al. |
| 6,700,972 B1 | 3/2004 | McHugh et al. |
| 6,714,639 B1 | 3/2004 | Bedingfield et al. |
| 6,724,752 B1 | 4/2004 | Turtiainen et al. |
| 6,731,741 B1 | 5/2004 | Fourcand et al. |
| 6,748,069 B1 | 6/2004 | Nimmagadda et al. |
| 6,760,343 B1 | 7/2004 | Krishnamurthy et al. |
| 6,782,004 B1 | 8/2004 | Brusilovsky et al. |
| 6,912,590 B1 | 6/2005 | Lundbäck et al. |
| 6,940,866 B1 | 9/2005 | Miller et al. |
| 6,944,184 B1 | 9/2005 | Miller et al. |
| 6,954,526 B1 | 10/2005 | Glenn et al. |
| 6,965,592 B2 | 11/2005 | Tinsley et al. |
| 6,967,956 B1 | 11/2005 | Tinsley et al. |
| 6,987,781 B1 | 1/2006 | Miller et al. |
| 6,990,089 B2 | 1/2006 | Benedyk et al. |
| 6,996,225 B1 | 2/2006 | Bordonaro et al. |
| 7,002,988 B1 | 2/2006 | Benedyk et al. |
| 7,031,340 B2 | 4/2006 | Sprague et al. |
| 7,035,260 B1 | 4/2006 | Betta et al. |
| 7,046,667 B2 | 5/2006 | Sprague et al. |
| 7,050,456 B1 | 5/2006 | Sprague et al. |
| 7,079,524 B2 | 7/2006 | Bantukul et al. |
| 7,088,728 B2 | 8/2006 | Delaney et al. |
| 7,113,581 B2 | 9/2006 | Benedyk et al. |
| 7,120,139 B1 | 10/2006 | Kung et al. |
| 7,190,702 B2 | 3/2007 | Sprague et al. |
| 7,197,036 B2 | 3/2007 | Craig |
| 7,242,695 B2 | 7/2007 | Sprague et al. |
| 7,274,662 B1 | 9/2007 | Kalmanek, Jr. et al. |
| 7,318,091 B2 | 1/2008 | Brendes et al. |
| 7,327,670 B2 | 2/2008 | Sprague et al. |
| 7,486,676 B1 | 2/2009 | Dunn et al. |
| 7,496,087 B2 | 2/2009 | Garnero et al. |
| 7,522,580 B2 | 4/2009 | Miller et al. |
| 7,525,997 B2 | 4/2009 | Benedyk et al. |
| 7,532,647 B2 | 5/2009 | Eichler et al. |
| 7,564,870 B2 | 7/2009 | Miller et al. |
| 7,573,905 B2 | 8/2009 | Benedyk et al. |
| 7,616,659 B2 | 11/2009 | Benedyk et al. |
| 7,743,131 B2 | 6/2010 | Brendes et al. |
| 7,804,789 B2 | 9/2010 | Craig et al. |
| 7,839,889 B2 | 11/2010 | Sprague et al. |
| 2001/0029182 A1 | 10/2001 | McCann et al. |
| 2001/0046227 A1 | 11/2001 | Matsuhira et al. |
| 2001/0046234 A1 | 11/2001 | Agrawal et al. |
| 2001/0049730 A1 | 12/2001 | Brendes et al. |
| 2001/0055380 A1 | 12/2001 | Benedyk et al. |
| 2002/0018447 A1 | 2/2002 | Yamada et al. |
| 2002/0021661 A1 | 2/2002 | DeGrandpre et al. |
| 2002/0048360 A1 | 4/2002 | Zambre et al. |
| 2002/0105969 A1 | 8/2002 | Benedyk et al. |
| 2002/0131400 A1 | 9/2002 | Tinsley et al. |
| 2002/0141386 A1 | 10/2002 | Minert et al. |
| 2002/0150221 A1 | 10/2002 | Carson et al. |
| 2003/0076815 A1 | 4/2003 | Miller et al. |
| 2003/0156578 A1 | 8/2003 | Bergenlid et al. |
| 2003/0177221 A1 | 9/2003 | Ould-Brahim et al. |
| 2003/0202507 A1 | 10/2003 | Nishida et al. |
| 2004/0017799 A1 | 1/2004 | Pulkka |
| 2004/0114611 A1 | 6/2004 | O'Connell et al. |
| 2005/0232407 A1 | 10/2005 | Craig et al. |
| 2005/0238036 A1 | 10/2005 | Miller et al. |
| 2005/0265341 A1 | 12/2005 | Benedyk et al. |
| 2005/0286502 A1 | 12/2005 | Benedyk et al. |
| 2006/0013203 A1 | 1/2006 | Benedyk et al. |
| 2006/0013204 A1 | 1/2006 | Benedyk et al. |
| 2006/0013264 A1 | 1/2006 | Eichler et al. |
| 2006/0023658 A1 | 2/2006 | Phillips et al. |
| 2006/0034329 A1 | 2/2006 | Miller et al. |
| 2006/0077978 A1 | 4/2006 | Sprague et al. |
| 2007/0008955 A1 | 1/2007 | Delaney et al. |
| 2007/0070980 A1 | 3/2007 | Phelps et al. |
| 2008/0075115 A1 | 3/2008 | Brendes et al. |
| 2009/0034512 A1 | 2/2009 | Bantukul et al. |
| 2011/0064075 A1 | 3/2011 | Sprague et al. |

FOREIGN PATENT DOCUMENTS

| | | |
|---|---|---|
| EP | 0 853 411 A2 | 7/1998 |
| EP | 1 014 735 | 12/1999 |
| EP | 1 054 568 | 5/2000 |
| EP | 1 026 861 A2 | 8/2000 |
| EP | 1 089 575 | 9/2000 |
| EP | 1 206 079 A2 | 5/2002 |
| EP | 1 679 848 A1 | 7/2006 |
| EP | 1 161 819 B1 | 8/2006 |
| EP | 1 177 660 81 | 8/2006 |
| EP | 1 135 905 B1 | 10/2006 |
| EP | 1 169 829 B1 | 10/2006 |
| EP | 1 169 816 B1 | 11/2006 |
| EP | 1 192 758 B1 | 2/2007 |
| EP | 1 755 295 A1 | 2/2007 |
| EP | 1 715 658 B1 | 10/2007 |
| EP | 1 371 246 B1 | 7/2008 |
| EP | 1 314 324 B1 | 8/2008 |
| EP | 1 755 295 B1 | 7/2009 |
| EP | 1 679 848 B1 | 3/2010 |
| EP | 1 290 854 B1 | 7/2010 |
| EP | 1 356 686 B1 | 7/2010 |
| EP | 1 169 871 B1 | 6/2011 |
| WO | WO 97/11563 A2 | 3/1997 |
| WO | WO 97/33441 | 9/1997 |
| WO | WO 97/42774 | 11/1997 |
| WO | WO 97/42776 | 11/1997 |
| WO | WO 97/46045 | 12/1997 |
| WO | WO 98/28879 | 7/1998 |
| WO | WO 98/28885 A1 | 7/1998 |
| WO | WO 98/28897 | 7/1998 |
| WO | WO 99/09759 | 2/1999 |
| WO | WO 99/16256 | 4/1999 |
| WO | WO 00/19758 A2 | 4/2000 |

| WO | WO 00/22840 | A2 | 4/2000 |
| --- | --- | --- | --- |
| WO | WO 00/30369 | A1 | 5/2000 |
| WO | WO 00/31933 | A1 | 6/2000 |
| WO | WO 00/33519 | A1 | 6/2000 |
| WO | WO 00/35155 | | 6/2000 |
| WO | WO 00/35156 | | 6/2000 |
| WO | WO 00/54476 | | 9/2000 |
| WO | WO 00/56032 | A1 | 9/2000 |
| WO | WO 00/60812 | | 10/2000 |
| WO | WO 00/60814 | | 10/2000 |
| WO | WO 00/60821 | | 10/2000 |
| WO | WO 00/65785 | | 11/2000 |
| WO | WO 00/76134 | A1 | 12/2000 |
| WO | WO 01/11825 | | 2/2001 |
| WO | WO 01/24499 | | 4/2001 |
| WO | WO 01/37532 | | 5/2001 |
| WO | WO 01/82635 | A1 | 11/2001 |
| WO | WO 01/93526 | A2 | 12/2001 |
| WO | WO 02/07455 | A1 | 1/2002 |
| WO | WO 02/056618 | A2 | 7/2002 |
| WO | WO 02/060192 | A2 | 8/2002 |

OTHER PUBLICATIONS

Notice of Allowance and Fee(s) Due for U.S. Appl. No. 10/890,779 (Dec. 15, 2008).
Interview Summary for U.S. Appl. No. 11/184,632 (Dec. 5, 2008).
Interview Summary for U.S. Appl. No. 10/890,779 (Nov. 4, 2008).
Communication pursuant to Article 94(3) EPC for European Application No. 01 939 711.6 (Nov. 4, 2008).
Official Action for U.S. Appl. No. 11/184,632 (Sep. 26, 2008).
Official Action for U.S. Appl. No. 11/180,028 (Sep. 4, 2008).
Official Action for U.S. Appl. No. 11/184,629 (Sep. 2, 2008).
Official Action for U.S. Appl. No. 11/130,422 (Aug. 14, 2008).
Notice of Allowance and Fee(s) Due for U.S. Appl. No. 11/184,439 (Jul. 30, 2008).
Notice of Allowance and Fee(s) Due for U.S. Appl. No. 11/224,705 (Jul. 17, 2008).
Communication pursuant to Article 94(3) EPC for European Application No. 00920080.9 (Jun. 27, 2008).
Official Action for U.S. Appl. No. 11/282,966 (Jun. 23, 2008).
Communication pursuant to Article 94(3) EPC for European Application No. 02705919.5 (May 27, 2008).
Official Action for U.S. Appl. No. 11/180,028 (May 5, 2008).
Official Action for U.S. Appl. No. 10/890,779 (May 2, 2008).
Official Action in U.S. Appl. No. 11/184,632 (Apr. 25, 2008).
Interview Summary for U.S. Appl. No. 11/224,705 (Mar. 25, 2008).
Communication pursuant to Article 94(3) EPC for European Application No. 07119613.3 (Mar. 17, 2008).
Supplementary European Search Report for European Application No. 00920080.9 (Feb. 14, 2008).
Extended European Search Report corresponding to European Patent No. 07119613.3 (Nov. 30, 2007).
Notice of Allowance and Fee(s) Due for U.S. Appl. No. 10/403,460 (Nov. 2, 2007).
Official Action for U.S. Appl. No. 11/224,705 (Sep. 28, 2007).
Official Action for U.S. Appl. No. 10/890,779 (Sep. 20, 2007).
Communication pursuant to Article 96(2) EPC for European Application No. 06005210.7 (Sep. 6, 2007).
Notice of Allowance and Fee(s) Due for U.S. Appl. No. 09/770,316 (Aug. 13, 2007).
Official Action for U.S. Appl. No. 10/403,460 (May 11, 2007).
Notice of Allowance and Fee(s) Due for U.S. Appl. No. 10/403,455 (May 9, 2007).
Communication pursuant to Article 96(2) EPC for European Application No. 06122282.4 (Apr. 11, 2007).
Notification of European Publication Number and Information on the Application of Article 67(3) EPC for European Application No. 05763616.9 (Mar. 21, 2007).
Communication pursuant to Article 96(2) EPC for European Application No. 00950411.9 (Mar. 2, 2007).
Communication pursuant to Rules 109 and 110 EPC for European Application No. 05763616.9 (Mar. 1, 2007).
Extended European Search Report for European Patent Application No. 06122282.4 (Jan. 19, 2007).

Notice of Allowance and Fee(s) Due for U.S. Appl. No. 10/403,459 (Dec. 21, 2006).
Advisory Action for U.S. Appl. No. 09/543,135 (Dec. 13, 2006).
Official Action for U.S. Appl. No. 09/770,316 (Dec. 5, 2006).
Communication pursuant to Article 96(2) EPC in European Application No. 01928718.4 (Nov. 20, 2006).
Communication pursuant to Article 96(2) EPC in European Application No. 06005210.7 (Aug. 30, 2006).
Supplemental Notice of Allowability for U.S. Appl. No. 09/839,394 (Aug. 17, 2006).
Official Action for U.S. Appl. No. 09/543,135 (Aug. 16, 2006).
Official Action for U.S. Appl. No. 10/403,460 (Aug. 9, 2006).
Official Action for U.S. Appl. No. 10/403,459 (Aug. 9, 2006).
Official Action for U.S. Appl. No. 10/403,455 (Aug. 9, 2006).
Communication pursuant to Article 96(2) EPC for European Application No. 00950411.9 (Jun. 23, 2006).
Official Action for U.S. Appl. No. 09/543,135 (Jun. 19, 2006).
Extended European Search Report for European Application No. 06005210.7 (Jun. 6, 2006).
Notification of Transmittal of the International Search Report and the Written Opinion of the International Searching Authority, or the Declaration in International Application No. PCT/US05/23456 (May 10, 2006).
Advisory Action for U.S. Appl. No. 09/770,316 (Mar. 21, 2006).
Notice of Panel Decision from Pre-Appeal Brief Review for U.S. Appl. No. 09/770,316 (Feb. 14, 2006).
Notice of Allowance and Fee(s) Due for U.S. Appl. No. 10/403,461 (Feb. 13, 2006).
Supplemental Notice of Allowability for U.S. Appl. No. 09/443,712 (Jan. 31, 2006).
Supplemental Notice of Allowability in U.S. Appl. No. 09/588,852 (Dec. 22, 2005).
Notice of Allowance and Fee(s) Due for U.S. Appl. No. 10/403,457 (Dec. 6, 2005).
Supplemental Notice of Allowability for U.S. Appl. No. 09/735,142 (Dec. 5, 2005).
Communication pursuant to Article 96(2) EPC in EP Patent Application No. 01989213.2 (Nov. 7, 2005).
Advisory Action for U.S. Appl. No. 09/543,135 (Sep. 21, 2005).
Official Action for U.S. Appl. No. 09/443,712 (Sep. 21, 2005).
Supplemental Notice of Allowability for U.S. Appl. No. 09/559,767 (Sep. 2, 2005).
Supplemental Notice of Allowability for U.S. Appl. No. 09/534,281 (Aug. 25, 2005).
Official Action for U.S. Appl. No. 09/770,316 (Jul. 27, 2005).
Notice of Allowance and Fee(s) Due for U.S. Appl. No. 09/768,881 (Jun. 2, 2005).
Official Action for U.S. Appl. No. 10/403,457 (May 19, 2005).
Official Action for U.S. Appl. No. 10/403,461 (May 17, 2005).
Notice of Allowance and Fee(s) Due for U.S. Appl. No. 09/537,835 (Apr. 19, 2005).
Official Action for U.S. Appl. No. 09/543,135 (Mar. 30, 2005).
Communication pursuant to Article 96(2) EPC for European Application No. 01989213.2 (Mar. 7, 2005).
Supplemental Notice of Allowability for U.S. Appl. No. 09/541,853 (Mar. 7, 2005).
Notice of Allowance in U.S. Appl. No. 09/588,852 (Mar. 2, 2005).
Notice of Allowance and Fee(s) Due for U.S. Appl. No. 09/618,807 (Feb. 25, 2005).
Notice of Allowance and Fee(s) Due for U.S. Appl. No. 09/735,142 (Feb. 14, 2005).
Notification of Transmittal of International Preliminary Examination Report for International Application No. PCT/US00/08837 (Feb. 7, 2005).
Notification of Transmittal of International Preliminary Report on Patentability for International Application No. PCT/US01/48269 (Jan. 11, 2005).
Official Action for U.S. Appl. No. 09/443,712 (Dec. 29, 2004).
Invitation pursuant to Article 96(2) and Rule 51(2) EPC for EP Application No. 00919979.5 (Dec. 16, 2004).
Official Action for U.S. Appl. No. 09/768,881 (Dec. 14, 2004).
Communication pursuant to Article 96(2) EPC for European Application No. 00939602.9 (Dec. 10, 2004).

Notice of Allowance and Fee(s) Due for U.S. Appl. No. 09/534,281 (Nov. 29, 2004).
Notice of Allowance and Fee(s) Due for U.S. Appl. No. 09/559,767 (Nov. 17, 2004).
Notice of Allowance and Fee(s) Due for U.S. Appl. No. 09/541,853 (Nov. 17, 2004).
Communication under Rule 112 EPC in European Application No. 01989213.2 (Nov. 17, 2004).
Communication pursuant to Article 96(2) EPC for European Application No. 00919614.8 (Nov. 10, 2004).
Official Action for U.S. Appl. No. 09/770,316 (Nov. 3, 2004).
Communication pursuant to Article 96(2) EPC for European Application No. 99965846.1 (Sep. 21, 2004).
Notice of Allowance and Fee(s) Due for U.S. Appl. No. 09/839,394 (Aug. 24, 2004).
Notice of Allowance and Fee(s) Due for U.S. Appl. No. 09/618,807 (Jul. 27, 2004).
Official Action for U.S. Appl. No. 09/541,853 (Jul. 15, 2004).
Restriction and/or Election Requirement for U.S. Appl. No. 09/770,316 (Jun. 14, 2004).
Official Action for U.S. Appl. No. 09/537,835 (Jun. 4, 2004).
Official Action for U.S. Appl. No. 09/735,142 (May 27, 2004).
Official Action for U.S. Appl. No. 09/543,135 (May 13, 2004).
Official Action for U.S. Appl. No. 10/403,457 (May 6, 2004).
Communication pursuant to Article 96(2) EPC for European Application No. 00928464.7 (Apr. 16, 2004).
Official Action in U.S. Appl. No. 09/588,852 (Apr. 13, 2004).
Official Action for U.S. Appl. No. 09/559,767 (Feb. 26, 2004).
Official Action for U.S. Appl. No. 09/443,712 (Feb. 17, 2004).
Official Action for U.S. Appl. No. 09/768,881 (Jan. 9, 2004).
Restriction Requirement in U.S. Appl. No. 09/588,852 (Dec. 30, 2003).
Official Action for U.S. Appl. No. 09/839,394 (Dec. 1, 2003).
Telcordia Technologies Specification of Signaling System No. 7, "Annex A: SS7 Message Priorities," GR-246-CORE, Issue 8 (Dec. 2003).
Communication pursuant to Article 96(2) EPC for European Application No. 00919979.5 (Nov. 18, 2003).
Communication pursuant to Article 96(2) EPC for European Application No. 00919614.8 (Nov. 17, 2003).
Notification of Transmittal of International Preliminary Examination Report for International Application No. PCT/US02/01977 (Nov. 10, 2003).
Official Action for U.S. Appl. No. 09/541,853 (Oct. 31, 2003).
Official Action for U.S. Appl. No. 09/618,807 (Oct. 22, 2003).
Notification of Transmittal of International Preliminary Examination Report for International Application No. PCT/US02/01977 (Sep. 23, 2003).
Official Action for U.S. Appl. No. 09/537,835 (Sep. 16, 2003).
Official Action for U.S. Appl. No. 09/443,712 (Aug. 18, 2003).
Official Action for U.S. Appl. No. 10/403,457 (Aug. 13, 2003).
Official Action for U.S. Appl. No. 09/543,135 (Jul. 25, 2003).
Restriction and/or Election Requirement for U.S. Appl. No. 09/541,853 (Jul. 16, 2003).
Notification of Transmittal of the International Search Report or the Declaration in International Application No. PCT/US01/48269 (May 22, 2003).
Written Opinion for International Application No. PCT/US02/01977 (May 21, 2003).
Official Action for U.S. Appl. No. 09/768,881 (May 9, 2003).
Official Action for U.S. Appl. No. 09/618,807 (Apr. 15, 2003).
Official Action for U.S. Appl. No. 09/443,712 (Mar. 14, 2003).
Invitation to Pay Additional Fees for International Appication No. PCT/US01/48269 (Feb. 26, 2003).
Restriction and/or Election Requirement for U.S. Appl. No. 09/443,712 (Jan. 29, 2003).
Notification of Transmittal of International Preliminary Examination Report for International Application No. PCT/US01/12922 (Apr. 3, 2002).
International Search Report for International Application No. PCT/US01/17483 (Mar. 25, 2002).
Written Opinion for International Application No. PCT/US01/12922 (Feb. 13, 2002).

Notice of Allowance and Issue Fee Due for U.S. Appl. No. 09/205,809 (Sep. 25, 2001).
Notification of Transmittal of International Preliminary Examination Report for International Application No. PCT/US00/11322 (Aug. 2, 2001).
Notification of Transmittal of International Preliminary Examination Report for International Application No. PCT/US00/08614 (Jul. 30, 2001).
Supplemental Notice of Allowability for U.S. Appl. No. 09/205,809 (May 23, 2001).
Notification of Transmittal of International Preliminary Examination Report for International Application No. PCT/US00/07876 (Mar. 27, 2001).
Notice of Allowance and Fees Due for U.S. Appl. No. 09/205,809 (Feb. 27, 2001).
Official Action for U.S. Appl. No. 09/205,809 (Jan. 3, 2001).
Sidebottom et al., "SS7 MTP3-User Adaptation Layer (M3UA)," Internet Draft, Network Working Group, pp. 1-79 (Nov. 2000).
Affidavit of Dr. Harry G. Perros (Oct. 11, 2000).
Notification of Transmittal of International Preliminary Examination Report for International Application No. PCT/US99/27572 (Oct. 6, 2000).
Notification of Transmittal of International Preliminary Examination Report for International Application No. PCT/US99/27397 (Oct. 5, 2000).
Stewart et al., "Stream Control Transmission Protocol," Request for Comments: 2960, Network Working Group pp. 1-118 (Oct. 2000).
"Digital Cellular Telecommunications System (Phase 2+) (GSM); Universal Mobile Telecommunications System (UMTS); Telecommunication Management Charging and Billing; 3G Call and Event Data for the Packet Switched (PS) Domain (3GPP TS 32.015 Version 3.3.0 Release 1999)," Global System for Mobile Communications, pp. 1-5 (Sep. 2000).
Sidebottom et al., "SS7 MTP3-User Adaptation Layer (M3UA)," Internet draft IETF Network Working Group, p. 1-75, (Sep. 2000).
Subbiah et al., "Transport Architecture Evolution in UMTS/IMT-2000 Cellular Networks," International Journal of Communication Systems, pp. 371-385 (Aug. 11, 2000).
Raivio, "Transport Protocol Evolution in 3G Networks," World Telecommunications Congress/ISS2000, pp. 1-11 (Aug. 5, 2000).
International Search Report in International Application No. PCT/US00/15561 (Aug. 2, 2000).
Official Action for U.S. Appl. No. 09/205,809 (Jun. 22, 2000).
Loughney, "IP-Based Signaling Needs in Radio Access Networks," Internet draft, draft-loughney-sigtran-ip-ran-00.txt, IETF SIGTRAN Working Group, p. 1-14, (Jun. 16, 2000).
"GPRS: General Packet Radio Service," Usha Communications Technology, pp. 1-23 (Jun. 2000).
Interview Summary for U.S. Appl. No. 09/205,809 (Apr. 14, 2000).
Loughney et al., "SS7 SCCP-User Adaptation Layer (SUA)," Internet draft, draft-loughney-sigtran-sua-00.txt, IETF Engineering Task Force, p. 1-46, (Mar. 8, 2000).
Official Action for U.S. Appl. No. 09/205,809 (Feb. 2, 2000).
"Universal Mobile Telecommunications System (UMTS); UTRAN lu Interface: General Aspects and Principles (3G TS 25.410 version 3.1.0 Release 1999)," ETSI, pp. 1-2 (Jan. 2000).
3RD Generation Partnership Project (3GPP), "Technical Specification Group Radio Access Network—UTRAN Overall Description," 3G TS 25.401 version 3.1.0, Release 1999, p. 1-34, (Dec. 17, 1999).
3RD Generation Partnership Project(3GPP),"Technical Specification Group Radio Access Network—UTRAN lu Interface: General Aspects and Principles," 3G TS 25.410 version 3.1.0, Release 1999, p. 1-23, (Dec. 12, 1999).
"Ericsson Announces General Availability of Its Mobile Advantage Wireless Office System," Ericsson Press Release, pp. 1-2 (Nov. 4, 1999).
Arango et al., "Media Gateway Control Protocol (MGCP), Version 1.0," Vertical Networks, RFC 2705, pp. 1-126 (Oct. 1999).
Ong et al., "Framework Architecture for Signaling Transport," Network Working Group, pp. 1-24 (Oct. 1999).
ITU-T Recommendation Q.2630.1 (Sep. 29, 1999).
ITU-T Recommendation Q.2150.1 (Jun. 23, 1999).

Sprague et al., "Transport Adapter Layer Interface," Tekelec, p. 1-30, (May 28, 1999).
Handley et al., "SIP: Session Initiation Protocol," Internet Draft, Network Working Group, pp. 1-141 (Mar. 1999).
Bressler, "SS7 Level Two Over IP," *Nortel Networks*, pp. 1-6 (Jan. 1999).
Johanson et al., "Mobile Advantage Wireless Office—A Digital Wireless Office System for TDMA/136 Networks," Ericsson Review No. 1, pp. 20-27 (1999).
Glaude et al., "SS7 to IP Signaling Gateway Transport Architecture", Internet Engineering Task Force, pp. 1-39 (Nov. 27, 1998).
Cuervo et al., "SSS-Internet Interworking—Architectural Framework," pp. 1-9 (Jul. 1998).
Nichols et al., "Definition of the Differentiated Services Field (DS Field) in the IPv4 and IPv6 Headers," Internet Engineering Task Force RFC 2474, pp. 1-20 (1998).
Douglas E. Corner, "Internetworking with TCP/IP," Principles, Protocols, and Architecture, 3rd ed., Prentice Hall (New Jersey), p. 6-8, (1995).
Bellcore, "Signaling Transfer Point (STP) Generic Requirements," GR-82-CORE, Issue 1 (Jun. 1994).
Yang et al., "The Design and Implementation of a Service Logic Execution Environment Platform," IEEE, pp. 1911-1917 (1993).
Almquist, "Type of Service in the Internet Protocol Suite," Internet Engineering Task Force RFC 1349, pp. 1-22 (Jul. 1992).
El-Toumi et al., "Interconnecting SS7 Signaling Networks," AT&T Bell Laboratories, IEEE, pp. 589-593 (1990).
Ex Parte Remark, 1990 WL 354512 (Bd.Pat.App. & Interf. 1990).
Internet Engineering Task Force RFC 791, University of Southern California, "Internet Protocol DARPA Internet Program Protocol Specification," pp. 1-45 (Sep. 1981).
*Henry Mfg. Co. Inc.* v. *Commercial Filters Corp*, 350 F.Supp. 1015 (S.D. Indiana 1971).
Official Action in European Application No. 01 939 711.6-2413 (Feb. 2, 2006).
Pai, "In-Building Wireless: The Next Generation," TelephonyOnline.com, pp. 1-4 (Jun. 30, 2004).
Handa, "In Building Wireless: The Next Generation," TMCnet.com, pp. 1-7 (Feb. 12, 2004).
Fitchard, "A New Voice in the Boardroom," Wireless Review, pp. 1-3 (Sep. 1, 2003).
"Fixed Wireless Technology," ISP Planet, pp. 1-4 (May 14, 2002).
Martinek, "Office on the Fly," Wireless Review, pp. 1-4 (Jul. 15, 2001).
"March Networks 3300 Integrated Communications Platform," Mitel Networks Corporation, pp. 1-34 (Jul. 2001).
Swartz, "Ready, Set, Wireless Office!," Wireless Review, pp. 1-4 (Jun. 1, 2000).
"Telstra and Ericsson Trial Next Generation Wireless Office Solution," Ericsson, pp. 1-2 (Apr. 28, 2000).
"Mitel and Ericsson Join Forces to Deliver an Integrated Digital Wireless Office Solution with PBX Functionality-Company Company Business and Marketing," Cambridge Telcom Report, pp. 1-4 (Apr. 24, 2000).
U.S. Appl. No. 09/543,135 for System and Method for Routing Calls from a Voice Network to a Data Communications Network (Apr. 5, 2000).
"Market and Development Agreement Targets Customers Looking for Ways to Become More Productive Through Convenient and Cost-Effective Communication," Ericsson Press Release, pp. 1-2 (Apr. 4, 2000).
Sulkin, "Emerging Options for Wireless PBXs," Voice2000, pp. 1-8 (Feb. 2000).
Drzewianowksi, "WLANs—For the Picking," Communications Solutions™ Next-Gen Networks, pp. 1-9 (2000).
"The Wireless Business Connection," Second Quarter 2000 Report, The Phillips Group—Infotech, pp. 1-9 (2000).
O'Shea, "Mating Season," Telephony, p. 10-11, (Sep. 20, 1999).
"Corporate Offices to Go Wireless First Australian GSM on the Net Trial," Ericsson Press Release, pp. 1-3 (Aug. 11, 1999).
"Ericsson Solution Chosen for World's First Combined DECT/GSM Communications Service," Ericsson, pp. 1-9 (Jun. 21, 1999).

U.S. Appl. No. 60/132,552 for Signal Transfer Point with Virtual Backplane (May 5, 1999).
Hamdi et al., "Voice Service Interworking for PSTN and IP Networks," IEEE Communications Magazine, p. 104-111, (May 1999).
Lakshmi-Ratan, "The Lucent Technologies Softswitch-Realizing the Promise of Convergence," Bell Labs Technical Journal, p. 174-195, (Apr.-Jun. 1999).
"Enterprise IP Gateway," Ericsson, pp. 1-6 (1999).
"The Ericsson IPT System," Ericsson, pp. 1-8 (1999).
"Wireless: Top Ericsson Executives Lay Out Corporate Vision, Unveil Strategy for the Enterprise Customer—Company Business and Marketing," EDGE, On & About AT&T, pp. 1-5 (Nov. 30, 1998).
Michael McGrew, "Transport SS7 Signaling Over IP," Lucent Technologies Inc, p. 1-8, (Nov. 1998).
"Ericsson Wireless Office Services to Provide Digital System Through AT&T Wireless Services," Ericsson Press Release, pp. 1-2 (Apr. 17, 1998).
Weekly Status Report for week of Jun. 15-Jun. 18, 1998.
Weekly Status Report for the weeks of Jul. 6-Jul. 10, 1998.
Weekly Status Report for week of Jul. 13-Jul. 17, 1998.
Affidavit of David M. Sprague filed in commonly-assigned, U.S. Appl. No. 09/443,712.
PCS Access Network Requirements: Interface Specification, Interface: Service Access Socket System Interface (SASSI), Version 01.01, Dec. 3, 1998.
PCS Access Network Requirements: Product Specification, Network Element: Gateway Signal Transfer Point between CCS/SS7 and TCP-IP Networks (GW-STP-IP), Dec. 3, 1998.
U.S. Appl. No. 60/110,398 for Signaling Link with Inherent Redundancy (Dec. 1, 1998).
Tekelec, "Eagle® Feature Guide," Publication P/N 910-1225-01, Revision B, (Jan. 1998).
O'Shea, "The Network That's Never Done," Telephony, p. 38, 40, 42, 43, (Sep. 15, 1997).
Tekelec, "Eagle STP: Database Transport Access Feature," Publication 908-0136-01, (1997).
Tekelec, "Eagle STP: Platform," Publication 908-0126-01, (1997).
Tekelec, "SS7-Frame Relay Access Device: SS7 Protocol Information Translator," Publication 908-0167-01, (1997).
Tekelec, "Eagle STP: ANSI-ITU Gateway Feature," Publication 908-0133-01, (1997).
Tekelec, "Eagle STP: X.25 to SS7/IS.41 Protocol Conversion Feature," Publication 908-0135-01, (1997).
Tekelec, "STP-LAN Interface Feature," Publication 980-0134-01, (1997).
Snyder, "Rerouting Internet Traffic Jams," Telephony, p. 12, (Nov. 11, 1996).
Snyder, "Branded With Optics," Telephony, p. 49-50, (Jul. 22, 1996).
Anonymous, "Around the Loop," Telephony, p. 26, (Jul. 22, 1996).
Woods, "Fresno Bee Still Buzzing About Wireless," TechNews, pp. 1-2 (1995).
Zaharychuk et al., "Gateway Signal Transfer Points: Design, Services and Benefits," IEEE, p. 0233-0240, (1990).
Bootman et al., "Generic Building Blocks for the Telecommunications Management Network," IEEE, p. 0163-0167, (1988).
Bootman et al., "Intelligent Network Services Using a Service Switching Node," IEEE, p. 1332-1335, (1988).
Buckles, "Very High Capacity Signaling Transfer Point for Intelligent Network Services," IEEE, p. 1308-1311, (1988).
"teleSys Announces the Compatibility of Ericsson's Mobile Advantage Wireless Office and teleSys' MACH7-IP Gateway," teleSys Software—Press Release, pp. 1-2 (Publication Date Unknown).
Official Action for U.S. Appl. No. 11/282,966 (Mar. 11, 2009).
Interview Summary for U.S. Appl. No. 11/184,632 (Feb. 25, 2009).
Notice of Allowance and Fee(s) Due for U.S. Appl. No. 11/224,705 (Feb. 24, 2009).
Communication pursuant to Article 94(3) EPC for European Patent Application No. 00 920 080.9 (Feb. 16, 2009).
Supplemental Notice of Allowability for U.S. Appl. No. 11/184,632 (Sep. 25, 2009).
Notice of Allowance and Fee(s) Due for U.S. Appl. No. 11/282,966 (Sep. 24, 2009).

Communication under Rule 71(3) EPC for European Application No. 06 005 210.7 (Sep. 24, 2009).
Official Action for U.S. Appl. No. 11/084,853 (Aug. 18, 2009).
Communication Regarding the Expiry of the Time Limit Within which Notice of Opposition may be Filed for European Patent No. 1314324 (Jul. 1, 2009).
Official Action for U.S. Appl. No. 11/986,493 (Jun. 9, 2009).
Decision to Grant a European Patent pursuant to Article 97(1) EPC for European Patent No. 1755295 (Jun. 5, 2009).
Official Action in U.S. Appl. No. 11/184,629 (Jun. 1, 2009).
Notice of Allowance and Fee(s) Due for U.S. Appl. No. 11/184,632 (Apr. 17, 2009).
Notice of Allowance and Fee(s) Due for U.S. Appl. No. 11/180,028 (Apr. 10, 2009).
Notification of Transmittal of International Preliminary Report on Patentability for International Application No. PCT/US00/19515 (Mar. 30, 2009).
Official Action for U.S. Appl. No. 11/084,853 (Jan. 8, 2009).
Restriction/Election Requirement for U.S. Appl. No. 11/084,853 (Sep. 23, 2008).
Written Opinion for International Application No. PCT/US00/19515 (Jun. 20, 2008).
Notification of Transmittal of the International Search Report or the Declaration for International Application No. PCT/US00/19515 (Mar. 26, 2001).
Notice of Allowance and Fee(s) Due for U.S. Appl. No. 11/130,422 (Feb. 9, 2009).
Supplementary European Search Report for European Application No. 05763616.9 (Feb. 4, 2009).
Plaintiff Tekelec's Answer to Defendant Performance Technologies, Incorporated's Counterclaims in the United States District Court for the Eastern District of North Carolina, Western Division, for Civil Action No. 09-CV-00531 (May 6, 2010).
Performance Technologies, Inc.'s Answer and Counterclaims to Tekelec's First Amended Complaint in the United States District Court for the Eastern District of North Carolina, Western Division, for Civil Action No. 09-CV-00531 (Apr. 15, 2010).
Communication pursuant to Article 94(3) EPC for European Application No. 05 763 616.9 (Apr. 14, 2010).
First Amended Complaint for Patent Infringement (Jury Trial Demanded) in the United States District Court for the Eastern District of North Carolina, Western Division, for Civil Action No. 09-CV-00531 (Mar. 3, 2010).
Communication under Rule 71(3) EPC for Application No. 01 939 711.6 (Feb. 9, 2010).
Final Official Action for U.S. Divisional Patent U.S. Appl. No. 11/184,629 (Jan. 6, 2010).
Complaint for Patent Infringement (Jury Trial Demanded) in the United States District Court for the Eastern District of North Carolina, Western Division, for Civil Action No. 09-CV-00531 (Dec. 9, 2009).
Supplemental Notice of Allowability for U.S. Appl. No. 11/282,966 (Nov. 16, 2009).
Bates et al., "Multiprotocol Extensions for BGP-4," Network Working Group, RFC 4760 (Jan. 2007).
3GPP, "3$^{rd}$ Generation Partnership Project; Technical Specification Group Services and System Aspects; IP Multimedia Subsystem (IMS); Stage 2," 3GPP TS 23.228, V6.15.0, p. 1-178 (Sep. 2006).
Rekhter et al., "A Border Gateway Protocol 4 (BGP-4)," Network Working Group, RFC 4271 (Jan. 2006).

Notice of Allowance and Fee(s) Due for U.S. Appl. No. 09/443,712 (Dec. 30, 2005).
Interview Summary for U.S. Appl. No. 09/443,712 (Jun. 25, 2003).
Written Opinion for International Application No. PCT/US01/17483 (May 14, 2003).
Chandra, "Capabilities Advertisement with BGP-4," Network Working Group, RFC 3392 (Nov. 2002).
Decision to Grant a European Patent pursuant to Article 97(1) EPC for European Patent No. 1356686 (Jun. 24, 2010).
Notice of Allowance and Fee(s) Due for U.S. Appl. No. 11/084,853 (May 24, 2010).
Communication Regarding the Expiry of the Time Limit Within which Notice of Opposition may be Filed for European Patent No. 1755295 (May 6, 2010).
Communication pursuant to Article 94(3) EPC for European Application No. 01 928 718.4 (Jun. 27, 2011).
Communication regarding the expiry of the time limit within which notice of opposition may be filed for European Application No. 02705919.5 (May 25, 2011).
Restriction/Election Requirement for U.S. Appl. No. 12/878,015 (May 24, 2011).
Communication regarding the expiry of the time limit within which notice of opposition may be filed for European Application No. 01939711.6 (May 18, 2011).
Stipulation of Dismissal in the United States District Court for the Eastern District of North Carolina, Western Division, for Civil Action No. 5:09-CV-00531 (May 4, 2011).
Communication under Rule 71(3) EPC for European Application No. 07 119 613.3 (Apr. 28, 2011).
Final Official Action for U.S. Appl. No. 11/184,629 (Mar. 9, 2011).
Communication regarding the expiry of the time limit within which notice of opposition may be filed for European Application No. 06005210.7 (Jan. 10, 2011).
Commonly-assigned, co-pending U.S. Appl. No. 12/950,688 for "Methods and Systems for Communicating Signaling System 7 (SS7) User Part Messages Among SS7 Signaling Points (SPs) and Internet Protocol (IP) Nodes Using Signal Transfer Points (STPs)," (Unpublished, filed Nov. 19, 2010).
Communication under Rule 71(3) EPC for Application No. 00 920 080.9 (Sep. 28, 2010).
Commonly-assigned, co-pending U.S. Appl. No. 12/878,015 (Unpublished, filed Sep. 8, 2010).
Performance Technologies, Inc.'s Preliminary Invalidity Contentions Pursuant to Local Civil Rule 303.3 in the United States District Court for the Eastern District of North Carolina, Western Division, for Civil Action No. 09-CV-00531-BO (Aug. 19, 2010).
Non-Final Official Action for U.S. Appl. No. 11/184,629 (Aug. 13, 2010).
Sidebottom et al., "SS7 MTP3-User Adaptation Layer (M3UA)," Internet Draft, draft-ietf-sigtran-m3ua-02.txt, Network Working Group, pp. 1-56 (Mar. 10, 2000).
Non-Final Official Action for U.S. Appl. No. 11/184,629 (Jul. 18, 2011).
Notice of Allowance and Fee(s) Due for U.S. Appl. No. 12/878,015 (Jan. 17, 2012).
Communication under Rule 71(3) EPC for European Application No. 05 763 616.9 (Jan. 13, 2012).
Interview Summary for U.S. Appl. No. 12/878,015 (Nov. 9, 2011).
Non-Final Official Action for U.S. Appl. No. 12/878,015 (Aug. 9, 2011).

LINKSET SELECTOR TABLE — 316

| Key(s) | | Data Fields | | | |
|---|---|---|---|---|---|
| 322 | 324 | 326 | 328 | 330 | 332 |
| DPC | ROUTE COST | LINKSET STATUS | ADJACENT STATUS | OVERALL STATUS | LINKSET NAME |
| 6-1-1 | 10 | A | A | A | LS1 |
| 6-1-1 | 20 | P | A | P | LS2 |
| 6-1-1 | 30 | A | A | A | LS3 |
| 7-1-1 | 10 | A | P | P | LS4 |
| 7-1-1 | 20 | A | A | A | LS5 |
| 7-1-1 | 30 | A | A | A | LS6 |

LINK SELECTOR TABLE — 318

| Key(s) | | Data Field | |
|---|---|---|---|
| 336 | 338 | 340 | 342 |
| LINKSET NAME | LINK | IMT/CARD ADDRESS | LINK STATUS |
| LS1 | 0 | 1305 | A |
| LS1 | 1 | 1307 | A |
| LS1 | 2 | 1305 | A |
| LS2 | 0 | 1500 | U |
| LS2 | 1 | 1505 | U |
| LS2 | 2 | 2300 | U |

*FIG. 7*

Routing Key Table 378

| DPC 382 | OPC 384 | SI 386 | CIC 388 | SSN 390 | SOCKET ID 392 |
|---|---|---|---|---|---|
| | | Key(s) | | | DATA FIELD |
| 3-1-1 | 6-1-1 | 3 | — | — | Sock1 |
| 3-1-2 | 6-1-1 | 3 | — | — | Sock2 |
| 3-1-3 | 6-1-1 | 3 | — | — | Sock3 |
| 1-1-1 | 6-1-1 | 3 | — | — | Sock4 |
| 1-1-1 | 6-1-1 | 3 | 25 | — | Sock5 |
| 1-1-3 | 6-1-1 | 5 | — | — | Sock6 |

*FIG. 9*

Socket Table

| Key | DATA FIELDS | | | | |
|---|---|---|---|---|---|
| | Local 395 | | Distant 396 | | |
| SOCKET ID 394 | IP ADDRESS | TCP PORT | IP ADDRESS | TCP PORT | SOCKET STATUS 397 |
| Sock1 | 10.10.10.10 | 24 | 10.10.10.1 | 24 | A |
| Sock2 | 10.10.10.10 | 42 | 10.10.10.2 | 42 | A |
| Sock3 | 10.10.10.10 | 12 | 10.10.10.3 | 12 | A |
| Sock4 | 10.10.10.10 | 54 | 10.10.20.1 | 54 | A |
| Sock5 | 10.10.10.10 | 16 | 10.10.20.2 | 16 | A |
| Sock6 | 10.10.10.10 | 76 | 10.10.20.3 | 17 | U |

*FIG. 10*

METHODS AND SYSTEMS FOR DISTRIBUTING OPERATING STATUS INFORMATION WITHIN A CONVERGED NETWORK

RELATED APPLICATIONS

This application is a divisional of U.S. patent application Ser. No. 09/770,316, filed Jan. 26, 2001 now U.S. Pat. No. 7,318,091, which claims the benefit of U.S. Provisional Patent Application No. 60/208,523 filed Jun. 1, 2000, the disclosure of each of which is incorporated herein by reference in its entirety.

TECHNICAL FIELD

The present invention relates to the distribution of network management information in a non-homogeneous communications network environment, and more particularly to methods and systems for generating and routing network management type signaling messages in a network environment that employs both a signaling system 7 (SS7) message transfer part (MTP) based network component and an Internet protocol (IP) based network component.

BACKGROUND

In modern telephony networks, service control points (SCPs) serve as an interface to telephony related databases, such as: call management service databases (CMSDB); line information databases (LIDB); and business services databases (BSDB). These databases are used, at least in part, to facilitate a variety of intelligent network (IN) type services including: find me service, follow me service, computer security service, call pickup service, store locator service, call waiting service, call block service, calling name delivery service, three way calling service, 800 number services, etc. Such telephony service databases may also be employed to provide communication service subscribers the flexibility to easily port their service from one communication service provider to another (i.e., number portability or local number portability).

It will be appreciated that the application of such SCP-type database services is not limited to the traditional wired public switched telephone network (PSTN), but is also widely implemented in the wireless telecommunications industry. Typical wireless network communication database applications include: home location registers (HLRs), visitor location registers (VLRs), authentication centers (AuCs), short message service centers (SMSCs), and equipment identification registers (EIRs). The term SCP is commonly used to broadly refer to a network element that includes a database system for providing database-intensive services, such as those discussed above.

It will also be appreciated that with the continuing convergence of traditional telecommunication networks and traditional data networks, the number and variety of converged or inter-network service related database applications designed to service the needs of combined data-telecommunications subscribers (e.g., presence service databases, telephony-to-WWW domain name servers, etc.) will increase dramatically in the future. As this converged network environment continues to evolve, so will the tendency of network operators to place SCP-like database nodes within the data network component of the converged network environment. That is to say, PSTN and wireless telephone network operators will likely find the economics of data network operation favorable to the placement of SCP-like database nodes within the data sub-network of the converged network environment, as opposed to the traditional PSTN—signaling system 7 (SS7) sub-network. As such, SCP and SCP-like network elements that have traditionally resided within an SS7 signaling network and been assigned a unique SS7 network address (point code and subsystem) would instead be placed within a data network, such as a transmission control protocol/Internet protocol (TCP/IP) based network, and would consequently be assigned an Internet protocol (IP) network address, hostname, and port number.

It will also be appreciated that in addition to database nodes, the convergence of telephony and data networks has led to the advent of numerous network elements that are associated with call setup and teardown functions which reside in or on the edge of the data network component of the converged communications network environment. Such network elements include media gateways (MGs), media gateway controllers (MGCs), and softswitch (SS) nodes, all of which are well known to those skilled in the art of Internet telephony. These nodes typically communicate using a data network based protocol (e.g., TCP/IP) in a manner similar to that of the SCP and SCP-like database nodes discussed above.

Shown in FIG. 1 is a sample converged communication network, generally indicated by the numeral 100. Converged network 100 includes a signaling system 7 (SS7) network component and an Internet protocol (IP) network component. The SS7 network component includes a service control point (SCP) 104, a signal transfer point (STP) 106, and an end office (EO) or service switching point (SSP) 108. It will be appreciated that these SS7 nodes are connected via dedicated SS7 communication links, and consequently communicate using SS7 formatted signaling messages. The IP network component includes an IP based database server (DBS) 112, a first media gateway controller (MGC) 114, and a second MGC 116. These IP nodes are connected via IP communication links, and consequently communicate using IP formatted signaling messages. A signaling gateway node (SG) 120 facilitates inter-network communication. SG 120 is adapted to communicate via one or more SS7 links with the SS7 network component, while simultaneously communicating with the IP network component via one or more TCP/IP connections or sockets. SG 120 provides a degree of signaling message protocol translation, such that signaling messages originating in the IP network may be properly communicated to the appropriate destination node in the SS7 network, and vice versa.

An example of this inter-network message communication functionality is also provided in FIG. 1. In this example, MGC node 116 formulates and transmits an IP-based query message, Q, that is ultimately destined for SCP node 104 in the SS7 network. However, it will be appreciated that the SS7 and IP sub-networks are separate and distinct entities that have a limited knowledge of each other's architecture or communication protocols. The query message passes through the IP network and eventually arrives at the signaling gateway node 120, where it is received, processed, and re-formatted into a form suitable for transmission through the SS7 network. A new SS7 query message, Q*, is subsequently generated and routed via STP 106 to the destination node, SCP 104. In response, SCP 104 generates an SS7 reply message, R*, which is routed via STP 106 back to SG 120. SG 120 again receives, processes, and re-formats the reply message into a form that is suitable for transmission through the IP network. The new IP reply message, R, is subsequently routed through the IP network back to MGC 116 in response to the original query.

The converged network architecture described above functions reasonably well; however, efficient and effective network management can become a significant problem in such networks. This difficulty arises from the same basic issue that was raised previously with regard to message routing; i.e., the SS7 and IP sub-networks are separate and distinct entities which have a limited knowledge of each other's architecture, communication protocols, and network management procedures.

With particular regard to the issue of network management, in a traditional SS7 signaling network there exist three categories of network management: traffic management, link management, and route management. Traffic management is the process of diverting messages away from failed links, while link management involves the activation and deactivation of signaling links. Route management is responsible for both re-routing messages around failed SS7 signaling points and controlling the flow of messages to any given signaling point in the network. Those skilled in the art of SS7 signaling network operation will appreciate such a network management strategy provides a layered approach to managing anomalistic events in an SS7 network. The SS7 protocol provides procedures designed to minimize the effects of network congestion and outages from the link level all the way up to the route level. Within the SS7 message transfer part (MTP) protocol, level two facilitates the detection of errors on individual signaling links. Level two is not concerned with communication abnormalities that arise outside the signaling point, but instead is adapted to resolve those issues associated with an individual signaling link. Again, it will be appreciated that every SS7 signaling link incorporates this function, which is controlled by level-three link management.

When an error is encountered, level two reports the error to level three, which in turn must then determine which error resolution procedures to invoke. In general, SS7 error resolution procedures begin at the lowest level, the link level, and work their way up to the highest level, the route level. While these procedures do not have a direct impact on routing or the status of signaling points, they do, however, trigger other level-three network management events.

Traffic management is effected by link management, primarily because traffic management must divert traffic away from a link that link management has failed and removed from service. For example, each SS7 signaling link may have a link buffer that stores messages to be transmitted. Once an acknowledgement is received from the receiving node, the corresponding message can be over-written or removed from the link buffer. If a message is not acknowledged within a predetermined time period, it will be retransmitted. Thus, messages must be stored in the link buffer until they are acknowledged.

When a signaling link fails, its associated link buffer in the transmitting node may contain many unacknowledged messages because the original messages may not have reached the destination or the acknowledgements may not have reached the source. Traffic management diverts traffic from the failed link to a new link and copies any unacknowledged messages from the link buffer associated with the failed link to the link buffer for the new link. The unacknowledged messages transferred to the new link buffer may then be retransmitted. In this manner, traffic management ensures the orderly delivery of all diverted traffic.

It should be noted that the traffic management process does not divert traffic away from a signaling point. The purpose of traffic management is simply to redirect traffic at a signaling point to a different signaling link associated with the signaling point. It is true, however, that the traffic management process does impact routes and route-sets to specific destinations. If a particular route is used by another signaling point to reach a destination, and traffic management has diverted traffic away from that route, adjacent signaling points may have to invoke route management procedures.

At the highest level, route management, unlike traffic management, diverts traffic away from signaling points that have become unavailable or congested. Regardless of the root cause, traffic management and link management will be involved at the affected signaling point. At the same time, all the signaling points around the affected signaling point are forced to invoke route management procedures to prevent messages from becoming lost.

In an SS7 network the above-described network management functionality is accomplished, in part, through the use of specific network management messages. A sample structure of a typical SS7 network management message or message signaling unit (MSU) 150 is illustrated in FIG. 2. It will be appreciated by those skilled in the art of SS7 signaling communications that signaling information field (SIF) 152 of MSU 150 contains data associated with a particular point code that is experiencing difficulty or a particular link that has failed. Additional status information, priority codes, and other relevant maintenance codes may also be included in SIF parameter 152, depending upon the particular type of network management message being sent.

There are a number of routing management messages that are commonly employed to re-direct traffic around a failed or congested route. Again, it will be appreciated that such messages may be sent by an SS7 signaling point in response to the failure of one or more provisioned links. More particularly, when a route fails, a routing management message is sent to all neighboring SS7 signaling nodes (i.e., those SS7 signaling nodes that are adjacent to the troubled signaling node). This routing management message informs the neighboring SS7 signaling nodes of the problem at the troubled node and also provides instructions regarding future routing to the troubled node. It will also be appreciated that routing management messages are also used to inform neighboring SS7 signaling nodes of the recovery of a previously troubled node. Such SS7 routing management messages include: transfer prohibited (TFP), transfer restricted (TFR), transfer controlled (TFC), transfer allowed (TFA) messages, transfer cluster prohibited (TCP), and transfer cluster allowed (TCA). These messages are only a subset of all network management messages defined in the SS7 protocol. A comprehensive discussion of SS7 network management and related issues can be found in *Signaling System #7* by Travis Russell, McGraw-Hill Publishing 1998.

A transfer prohibited (TFP) message is generated and transmitted by an SS7 signaling point (e.g., an STP) in response to determining that communication with an SS7 node is no longer possible. In response to determining that communication with an SS7 node is possible, but sub-optimal, a transfer restricted (TFR) message is sent. A TFR message essentially requests that adjacent SS7 signaling points use alternate routes when sending messages to the troubled SS7 node. If alternate routes are not available, messages may continue to be routed normally. A transfer controlled (TFC) message is sent by an SS7 signaling point (e.g., STP) in response to the receipt of an MSU that is destined for a congested route. In such a scenario, the MSU is discarded and a TFC message is returned to the originator or sender of the MSU. A transfer allowed (TFA) message is sent by an SS7 signaling point when a previously failed route once again becomes available.

Shown in FIG. 3 is a scenario involving network management message flow in converged communications network 100 described above with regard to FIG. 1. In this example, it is assumed that the SS7 communication link that connects STP 106 and SCP 104 has failed. In response to the detection of this failure, STP 106 transmits a transfer prohibited (TFP) network management message to each of it's neighboring SS7 signaling points, SSP 108 and SG 120. Consequently, both SSP 108 and SG 120 are made aware that they should not attempt to send any SS7 MSU traffic to SCP 104 via a route that involves STP 106.

It will be appreciated that, in the absence of such proactive network management procedures, SSP 108 and SG 120 might flood STP 106 with MSUs as a result of continuous, repeated attempts to obtain a response from the failed or inaccessible SCP 104. In such a scenario, STP 106 could incur significant congestion that might interfere with or prevent the routing of messages to other available SS7 signaling nodes in the network. As such, it is possible that the failure of one node in the network could potentially lead to the failure of another, and so on. It is precisely this situation that SS7 network management procedures are designed to prevent.

Given the discussion above, a significant problem encountered with converged networks now becomes more apparent. As shown in FIG. 3, SSP 108 and SG 120 are notified that they should no longer send messages to SCP 104. However, since nodes in the IP component of the converged network are not capable of directly receiving and interpreting SS7 messages, there is no method of notifying any IP nodes in the IP sub-network that messages destined for SCP 104 should not be sent. Those skilled in the art of IP network operation will appreciate that some transport and higher layer protocols in the IP protocol stack employ periodic retransmission of messages if no response or acknowledgment is received within a pre-defined acknowledgment interval. As such, SG 120 may become flooded with re-transmitted query messages, destined for SCP 104, from nodes within the IP network. Again, it will be appreciated by those skilled in the art of communication network operations that such a scenario can have significant adverse impacts on the overall viability of the converged network.

Therefore, what is needed is a system and method of extending network management functionality in converged communication network environment such that anomalistic events, and any subsequent resolution procedures, occurring in one sub-network component of the converged network can be effectively communicated to another sub-network component of the converged network.

SUMMARY

The present invention includes a communications network element that is capable of routing messages and also performing inter-network management functions in a converged telephony-data network environment. In one embodiment, the present invention is implemented in the form of a signaling gateway routing node which is adapted to facilitate signaling communication between nodes in a signaling system 7 network and nodes in an Internet protocol (IP) network. In addition to basic message routing functionality, the signaling gateway routing node is adapted to notify nodes in the IP network when a node in the SS7 network becomes congested or unavailable. In certain cases, the signaling gateway selectively notifies only IP nodes that are concerned with the status of the troubled SS7 node; while in other cases, notification messages are broadcast to all relevant IP nodes. The signaling gateway also serves to limit the number of status queries or polling messages that are conveyed from IP nodes through to the distressed SS7 node, thereby reducing needless congestion in the SS7 network during a node distress episode. By doing so, the signaling gateway routing node according to an embodiment of the present invention provides much needed network management service in the converged telephony-data network environment.

The functions for providing converged network management are described herein as modules or processes. It is understood that these modules or processes may be implemented as computer-executable instructions embodied in a computer-readable medium. Alternatively, the modules or processes described herein may be implemented entirely in hardware. In yet another alternative embodiment, the modules or processes described herein may be implemented as a combination of hardware and software.

The processes and modules for providing converged network management functionality are described below as being associated with cards or subsystems within a gateway routing node. It is understood that these cards or subsystems include hardware for storing and executing the processes and modules. For example, each card or subsystems described below may include one or more microprocessors, such as an x86 microprocessor available from Intel Corporation, and associated memory.

Accordingly, it is an object of the present invention to provide a routing node that facilitates the inter-network communication of network management type messages in a converged network environment.

It is another object of the present invention to provide a system and method for use in a converged network environment whereby an Internet protocol (IP) device is able to divert traffic from one of a mated pair of signaling gateway (SG) nodes to the other in the event that one of the mated SG nodes is not able to access a particular destination point code.

It is yet another object of the present invention to provide a system and method for use in a converged network environment whereby an IP device is able to audit the status of a point code associated with an SS7 signaling point.

It is yet another object of the present invention to provide a system and method for use in a converged network environment whereby network management information associated with a distressed SS7 node is distributed to concerned nodes in an IP network.

It is yet another object of the present invention to provide a system and method for use in a converged network environment whereby an IP device may be notified of congestion in an SS7 sub-network component of the converged network environment.

It is yet another object of the present invention to provide a system and method for use in a converged network environment whereby an IP device is able to assist in the abatement of congestion in an SS7 sub-network component of the converged network environment.

It is yet another object of the present invention to provide a system and method for use in a converged network environment whereby an IP device is able to obtain SS7 User Part Unavailability status from in an SS7 sub-network component of the converged network environment.

It is yet another object of the present invention to provide a system and method for use in a converged network environment whereby only one of a plurality of similar status request queries or polling messages sent by IP nodes is permitted to enter an SS7 network component of the converged network.

It is yet another object of the present invention to provide a system and method for use in a converged network environment whereby the receipt of a single SS7 network management message results in the distribution of multiple IP messages containing the SS7 network management message information.

Some of the objects of the invention having been stated hereinabove, other objects will become evident as the description proceeds, when taken in connection with the accompanying drawings as best described hereinbelow.

BRIEF DESCRIPTION OF THE DRAWINGS

FIG. 7 is diagram illustrating sample linkset and link selector tables associated with LIM 300 illustrated in FIG. 6.

FIG. 9 is a diagram illustrating a sample routing key table associated with eDCM 350 illustrated in FIG. 8.

FIG. 10 is a diagram illustrating a sample socket table associated with eDCM 350 illustrated in FIG. 8.

DETAILED DESCRIPTION

Figure 1:
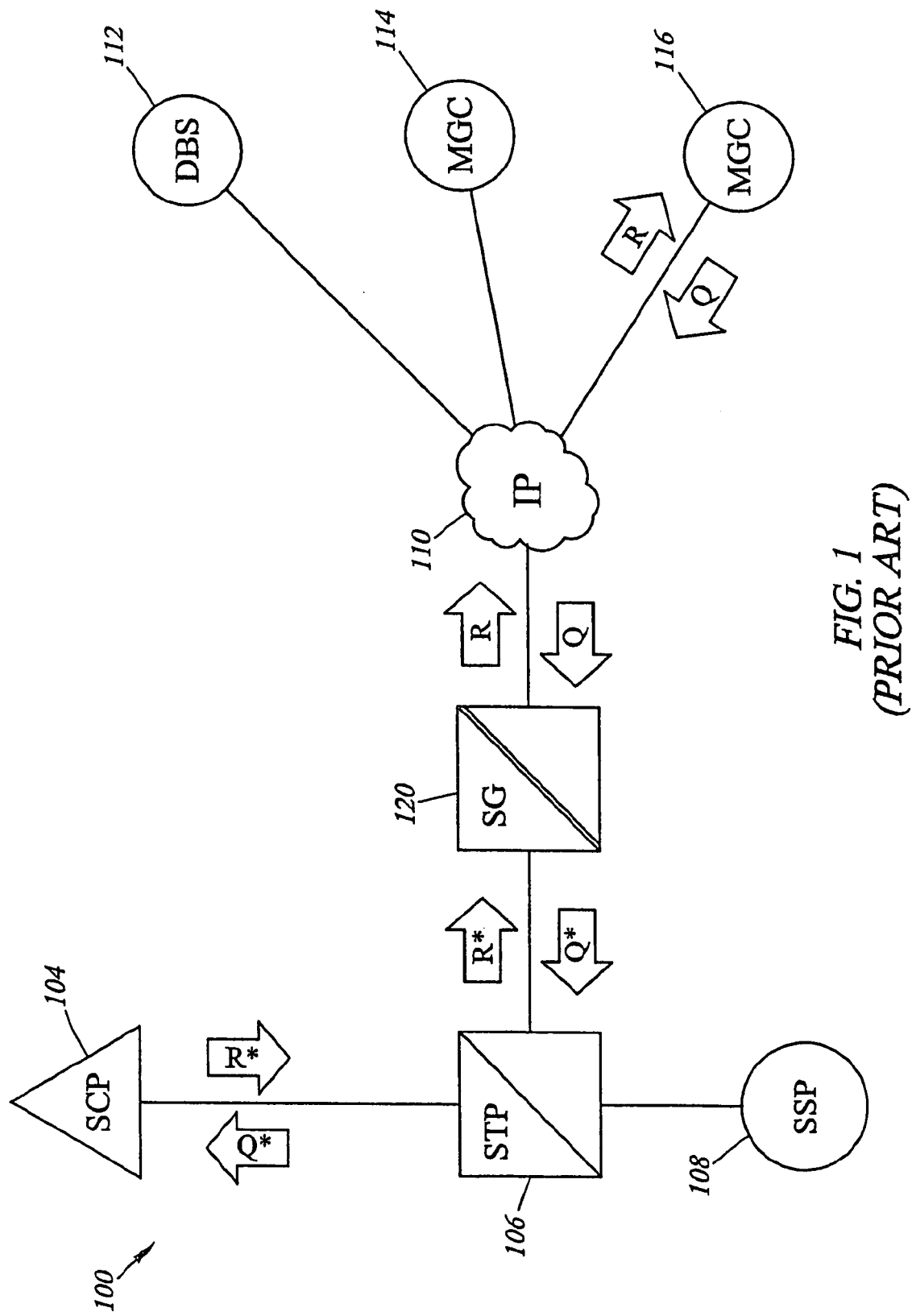
FIG. 1 is a network diagram illustrating signaling message flow through a conventional converged telephony-data network.
Figure 2:
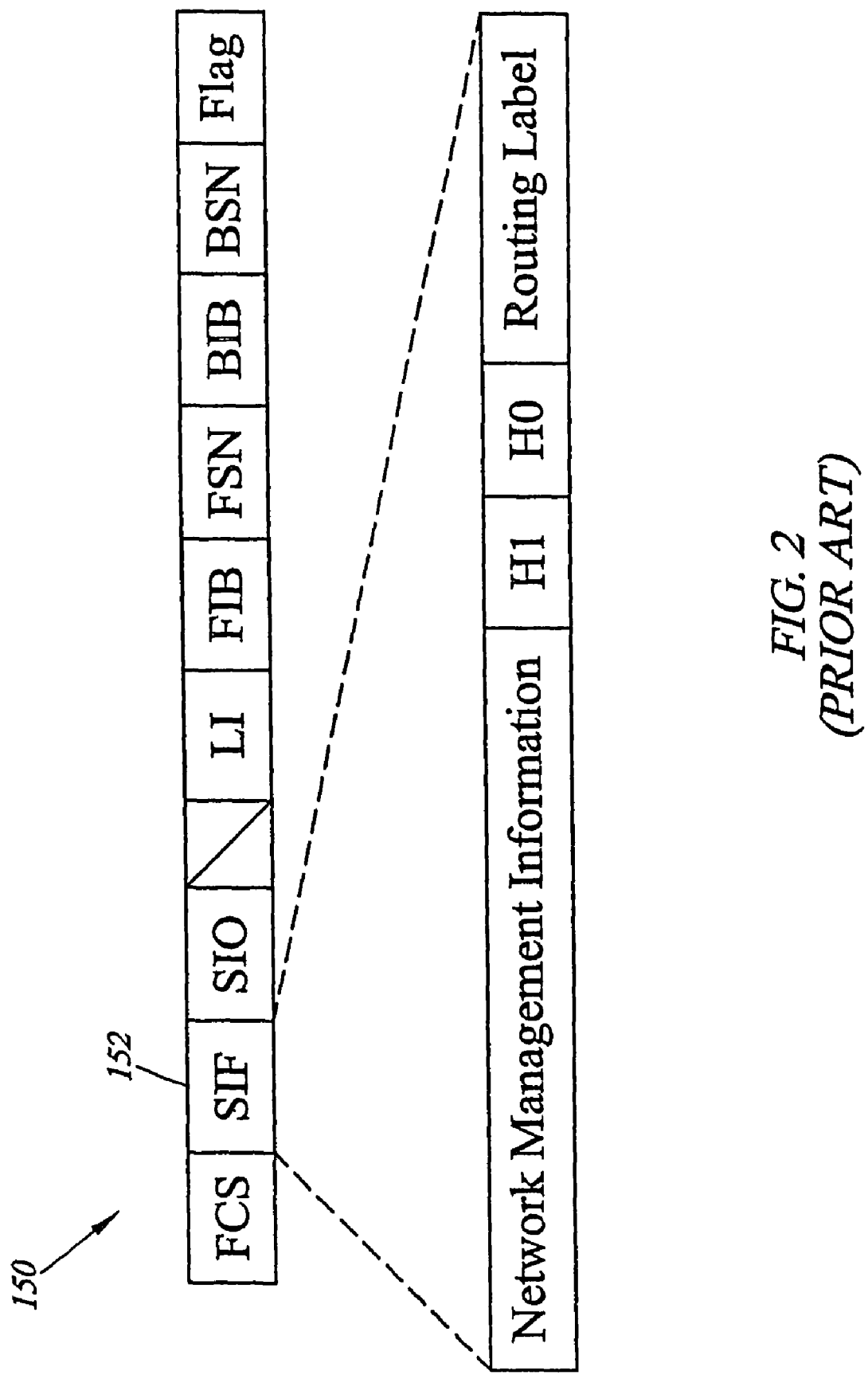
FIG. 2 is a schematic diagram of a conventional signaling system 7 (SS7) network management message structure.
Figure 3:
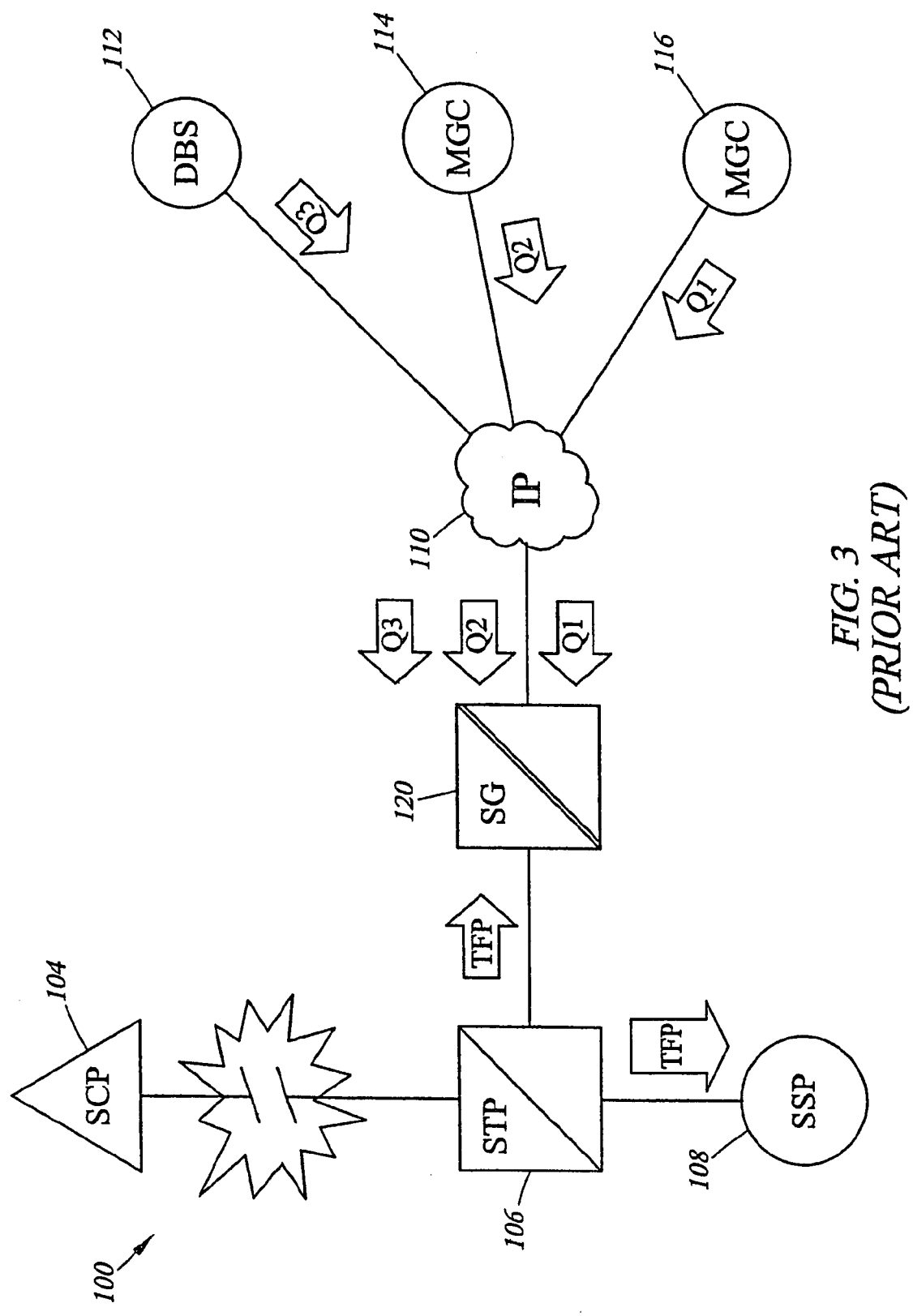
FIG. 3 is a network diagram illustrating conventional signaling message flow through a converged telephony-data network in the event of an SS7 signaling link failure.
Figure 4:
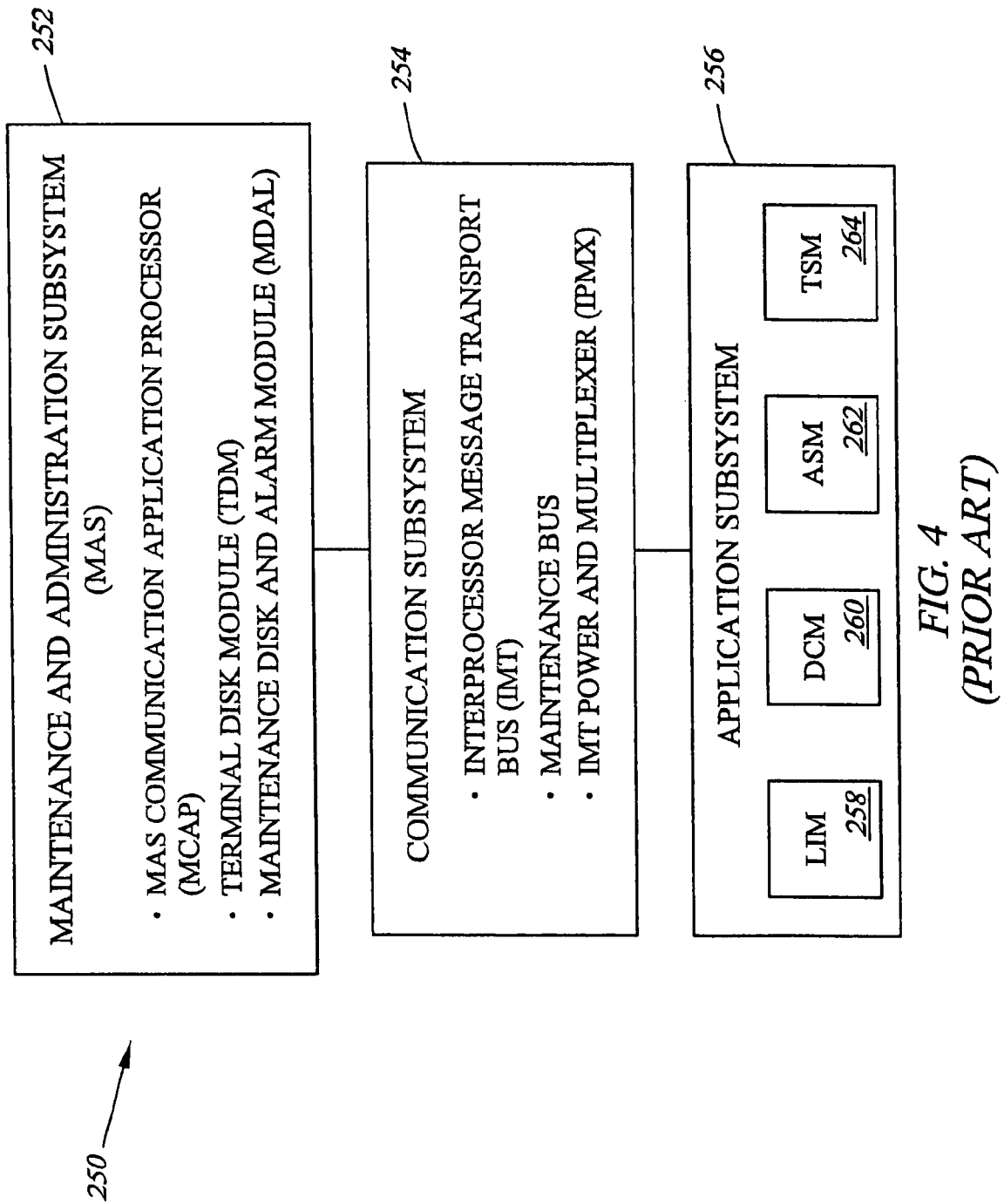
FIG. 4 is a block diagram of a conventional signaling gateway routing node architecture suitable for use with embodiments of the present invention.

Disclosed herein are several embodiments of the present invention, all of which include a network element that performs functions similar to that of a traditional telecommunications network packet routing switch, such as a signaling gateway routing node (SG). Each of the embodiments described and discussed below, employs an internal architecture similar to that of high performance signal transfer point (STP) and SG products which are marketed by the assignee of the present application as the Eagle® STP and IP[7] Secure Gateway™, respectively. A block diagram that generally illustrates the base internal architecture of the IP[7] Secure Gateway™ product is shown in FIG. 4. A detailed description of the IP[7] Secure Gateway™ may be found in Tekelec publication PN/909-0767-01, Rev B, August 1999, entitled *Feature Notice IP[7] Secure Gateway™ Release* 1.0, the disclosure of which is incorporated by reference in its entirety. Similarly, a detailed description of the Eagle® STP may be found in the *Eagle® Feature Guide* PN/910-1225-01, Rev. B, January 1998, published by Tekelec, the disclosure of which is incorporated herein by reference in its entirety. The specific functional components of an IP[7] Secure Gateway™ for transmitting and receiving transaction capabilities application part (TCAP) messages over an Internet Protocol (IP) network are described in commonly-assigned, co-pending International Patent Publication No. WO 00/35155, the disclosure of which is incorporated herein by reference in its entirety. Similarly, the functional components of an IP[7] Secure Gateway™ for transmitting and receiving ISDN user part (ISUP) messages over an Internet Protocol (IP) network are described in commonly-assigned, co-pending International Patent Publication No. WO 00/35156, the disclosure of which is also incorporated herein by reference in its entirety. As described in the above referenced *Feature Notice IP[7] Secure Gateway™*, an IP[7] Secure Gateway™ 250 includes the following subsystems: a Maintenance and Administration Subsystem (MAS) 252; a communication subsystem 254 and an application subsystem 256. MAS 252 provides maintenance communications, initial program load, peripheral services, alarm processing and system disks. Communication subsystem 254 includes an Interprocessor Message Transport (IMT) bus that is the main communication bus among all subsystems in the IP[7] Secure Gateway™ 250. This high-speed communications system functions as two 125 Mbps counter-rotating serial buses.

Application subsystem 256 includes application cards that are capable of communicating with the other cards through the IMT buses. Numerous types of application cards can be incorporated into SG 250, including but not limited to: a link interface module (LIM) 258 that interfaces with SS7 links and X.25 links, an data communication module (DCM) 260 that provides an Internet Protocol (IP) interface using Transmission Control Protocol (TCP), and an application service module (ASM) 262 that provides global title translation, gateway screening, and other services. DCM 260 sends and receives Internet Protocol (IP) encapsulated SS7 messages over an IP network, as described in the above referenced *Feature Notice IP[7] Secure Gateway™ Release* 1.0 publication.

Signaling Gateway Architecture

Figure 5:
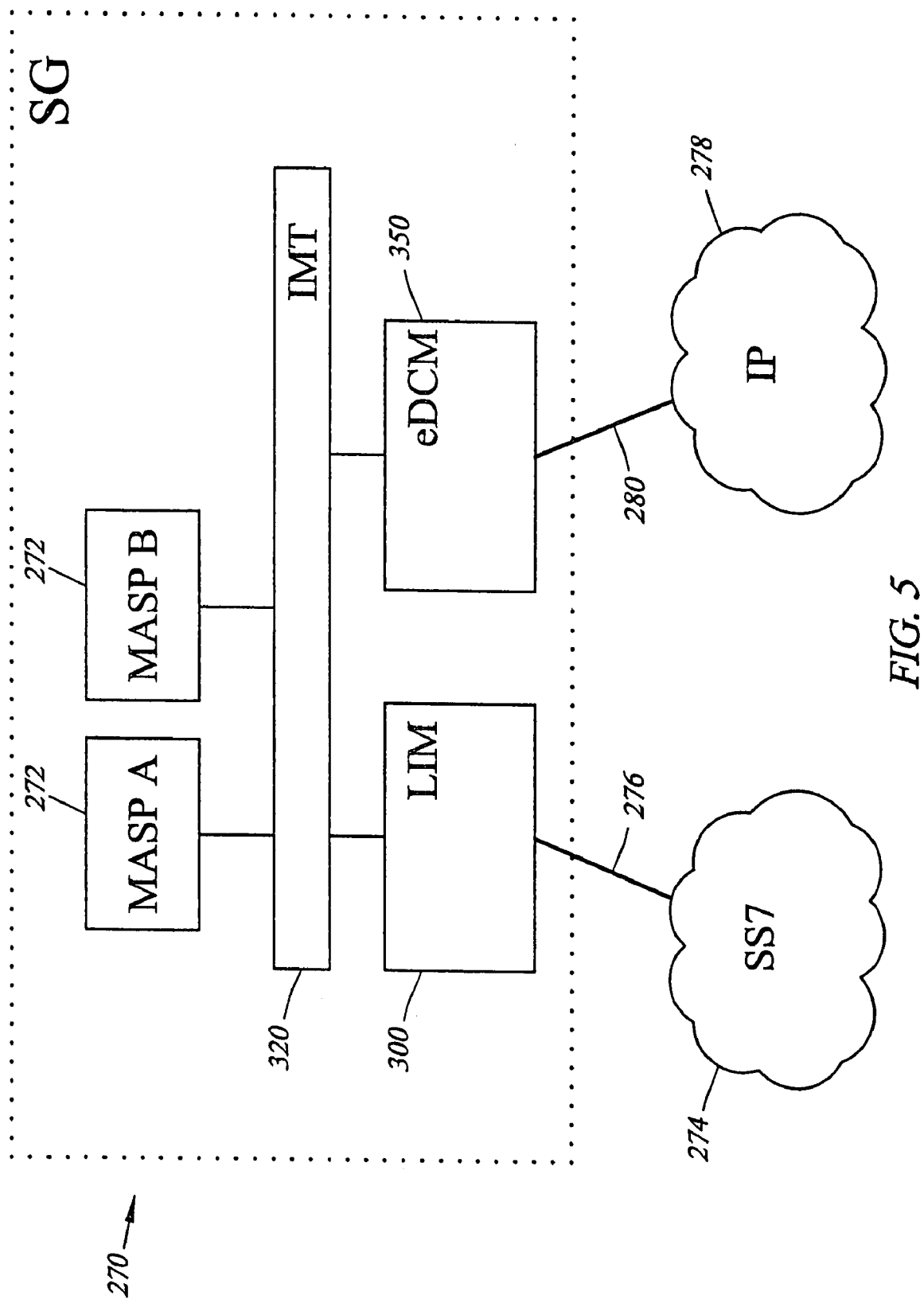
FIG. 5 is a schematic diagram of a signaling gateway routing node according to an embodiment of the present invention.

FIG. 5 illustrates a signaling gateway (SG) routing node according to an embodiment of the present invention that is generally indicated by the numeral 270. In FIG. 5, SG routing node 270 is communicatively coupled to a signaling system 7 (SS7) signaling network 274 via an SS7 signaling link 276, and to an Internet Protocol (IP) data network 278 via an IP connection 280. It will be appreciated that these networks, taken together, constitute the functional network components of a converged telephony-data network. As such, telephony-related signaling information may be transported through either network sub-component. As further illustrated in FIG. 5, SG routing node 270 includes a high-speed interprocessor message transport (IMT) communications bus 320. Communicatively coupled to IMT bus 320 are a number of distributed processing modules or cards including: a pair of maintenance and administration subsystem processors (MASPs) 272, an SS7 capable link Interface module (LIM) 300, and an Internet protocol (IP) capable enhanced data communication module (eDCM) 350. These modules are physically connected to the IMT bus 320 such that signaling and other types of messages may be routed internally between all active cards or modules. For simplicity of illustration, only a single LIM 300 and DCM 350 are included in FIG. 5. However, it should be appreciated that the distributed, multi-processor architecture of the SG routing node 270 facilitates the deployment of multiple LIM, DCM and other cards, all of which could be simultaneously connected to and communicating via IMT bus 320.

From a hardware perspective, LIM 300 and eDCM 350 may each comprise a printed circuit board physically connected to IMT bus 320. Each printed circuit board may include a communication processor programmed to send and receive messages via IMT bus 320. Each printed circuit board may also include an application processor programmed to perform various functions. For example, the application processor of eDCM 350 may be programmed to perform the functions described herein for sending SS7 network management messages to IP nodes.

MASP pair 272 implement the maintenance and administration subsystem functions described above. As MASP pair 272 are not particularly relevant to a discussion of the flexible routing attributes of the present invention, a detailed discussion of their function is not provided herein. For a comprehensive discussion of additional MASP operations and functionality, the above-referenced Tekelec IP[7] Secure Gateway™ and Eagle® STP publications can be consulted.

Given the SG routing node internal architecture shown in FIG. 5 and briefly discussed above, it will be appreciated that the most fundamental operation of the SG 270 involves the receipt of a signaling message at LIM 300 from an SS7 network and the subsequent internal routing of this message to eDCM 350 for transmission into the IP network 278, and vice versa.

Link Interface Module (LIM) Architecture

Figure 6:
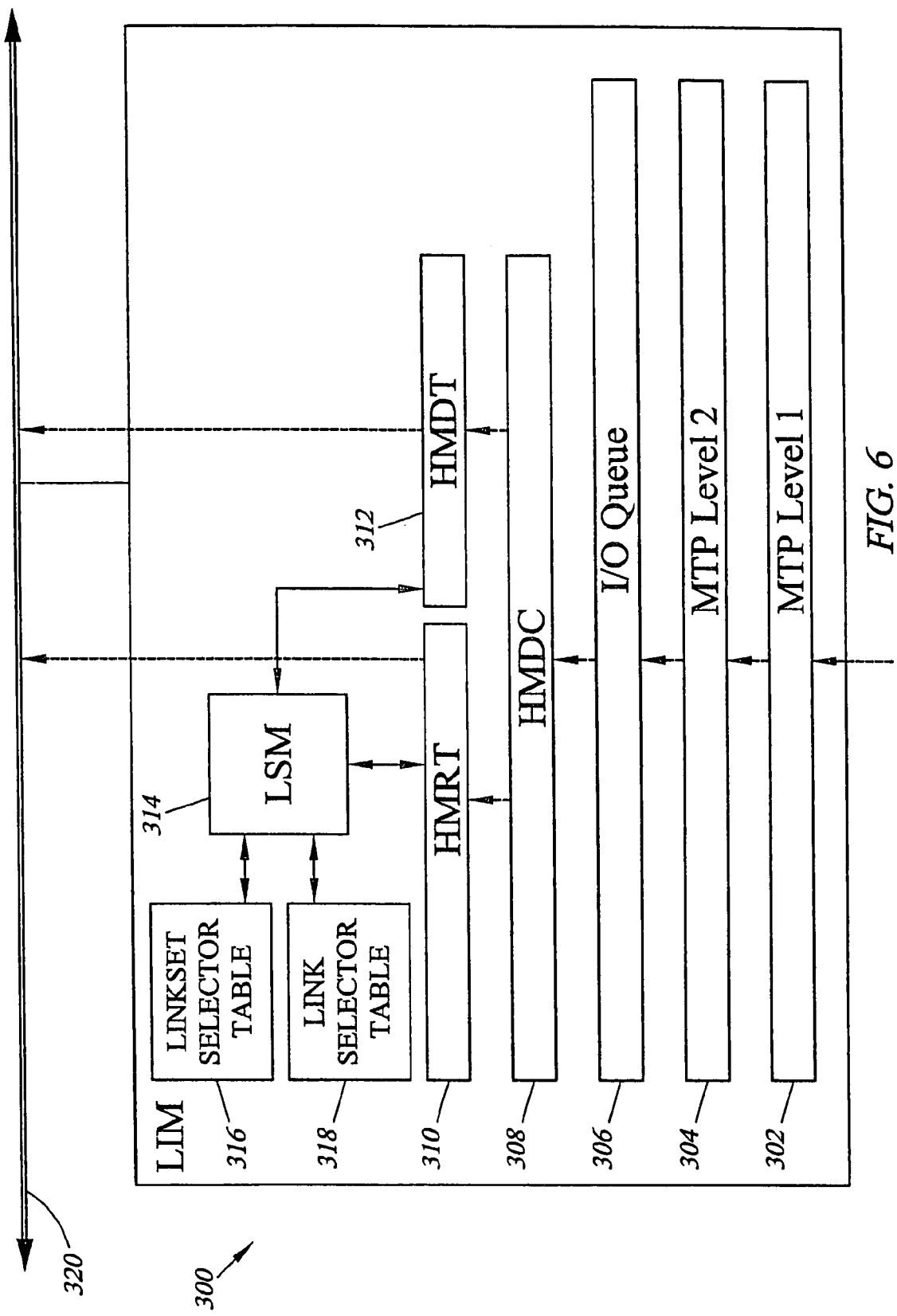
FIG. 6 is a schematic diagram of an SS7 link interface module (LIM) illustrating message flow associated with the receipt of a network management message according to an embodiment of the present invention.

Referring to FIG. 6 and focusing now on LIM card functionality, it will be appreciated that LIM 300 is comprised of a number of sub-component processes including, but not limited to: an SS7 message transfer part (MTP) level 1 process 302, an SS7 message transfer part (MTP) level 2 process 304, an I/O buffer or queue 306, an SS7 MTP level 3 message handling and discrimination (HMDC) process 308, a message handling and routing (HMRT) process 310, and a message handling and distribution (HMDT) process 312. MTP level 1 process 302 is adapted to provide the facilities necessary to send and receive digital data over a particular physical media/physical interface, such as a DS0 type communication link. Working in conjunction with the MTP level 1 process 302, MTP level 2 process 304 provides for basic error detection/correction and sequenced delivery of all SS7 message packets. I/O queue 306 provides for temporary buffering of incoming and outgoing SS7 signaling message packets. HMDC process 308 receives signaling messages from the lower processing layers and performs a discrimination function, effectively determining whether an incoming SS7 message packet requires internal processing or is simply to be through switched. HMRT process 310 is adapted to receive and route messages from the discrimination process 308 that do not require further processing at the SG and are simply to be through switched. HMDT process 312 is adapted to facilitate the internal routing of SS7 message packets, received from the discrimination process 308, that do require additional SG based processing prior to final routing.

Also included on LIM 300 are a functional group of processes that are generally associated with the routing of signaling messages, at both an internal and external level. That is, the information contained in this group of functional processes comprises a set of rules for the routing of a received signaling message within an associated signaling network. Tightly coupled or closely related to this set of network routing rules is an associated set of rules that describe and define the routing of the signaling message within the SG node.

As indicated in FIG. 6, these functional routing processes include a link selection manager (LSM) process 314, a linkset selector table 316, and a link selector table 318. Tables 316 and 318 contain signaling route and signaling route status information, along with internal IMT bus routing information. As mentioned above, these tables facilitate the overall routing of an SS7 signaling message received by the LIM 300. LSM process 314 is adapted to perform a number of functions including the administration of routing data within the linkset and link selector tables 316 and 318, respectively. LSM 314 is further adapted to notify other communication modules, generally within the SG, and coupled to IMT bus 320 of changes in the status of links and other nodes in the SS7 network. In one embodiment of the present invention, LSM 314 is adapted to receive an SS7 network management (NM) message, use information contained within the NM message to update route status information in linkset selector table 316 and link selector table 318, respectively, and subsequently distribute the NM information to other communication modules connected to IMT bus 320.

FIG. 7 includes sample table structures and data associated with linkset and link selector tables 316 and 318, respectively. Example linkset selector table 316 includes a key field that is used to effectively index the data table. This index is comprised of an SS7 destination point code (DPC) 322. Linkset selector table 316 also includes a route cost field 324, a linkset status field 326, an adjacent node status field 328, an overall status field 330, and a linkset identifier or pointer field 332.

Link selector table 318 includes a compound key that is comprised of a linkset identifier 336 and a signaling link field 338. Link selector table 318 also includes an IMT address field 340, which contains IMT bus address information associated with communication modules that are connected to the IMT bus 320. More particularly, a record in the table 318 includes an IMT address value that is associated with the communication module that supports the specific link identified in the record key. For example, as shown in FIG. 7, link 0 of linkset 1 resides on a communication module that has an IMT bus address of 1305. Furthermore a link status field 342, indicates that link 0 of linkset 1 is available for service.

It will be appreciated, as generally indicated in FIG. 6, that a first database lookup in linkset selector table 316 returns an index value or pointer that is subsequently used in a second database lookup in link selector table 318. The ultimate result of this two-stage lookup procedure is an IMT bus address associated with a communication module. It will also be appreciated that any number of database configurations or structures could be effectively employed to achieve a functionality similar to that described above. The database table structures shown in FIG. 7 merely illustrate one example implementation.

Once again, it should be appreciated that a LIM card may contain more functional processes than those described above. The above discussion is limited to LIM functionality associated with the basic processing of inbound SS7 signaling messages.

Enhanced Data Communication Module (eDCM) Architecture

Figure 8:
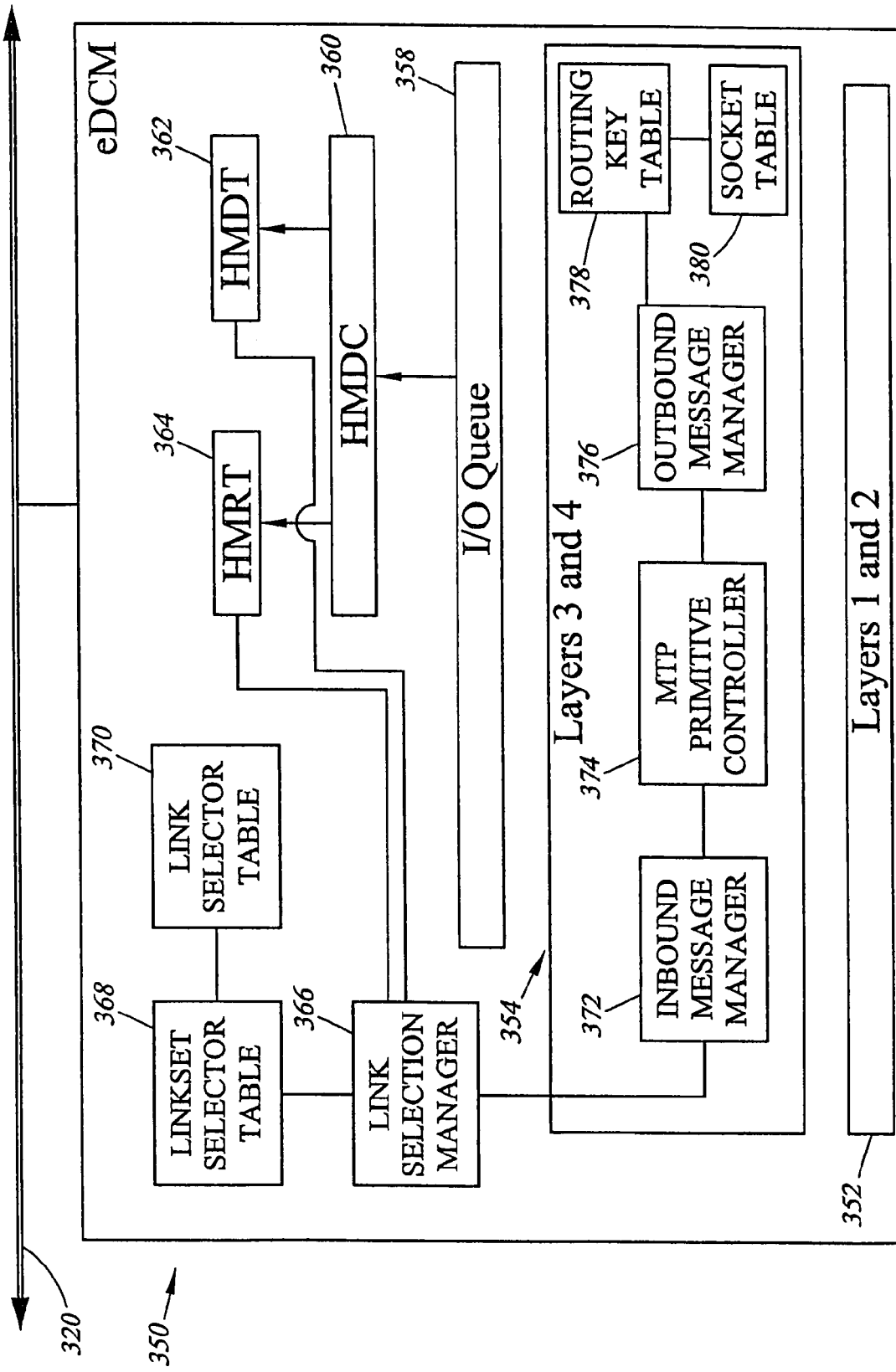
FIG. 8 is a schematic diagram of an Internet protocol (IP) capable enhanced data communication module (eDCM) according to an embodiment of the present invention.

FIG. 8 illustrates an enhanced data communication module (eDCM) according to an embodiment of the present invention, generally indicated by the numeral 350. eDCM 350 is connected to IMT communication bus 320 and is comprised of a number of functional modules or processes. These modules include: a layers 1 and 2 module 352, a layers 3 and 4 module 354, an I/O buffer or queue 358, an HMDC (message discrimination) process 360, an HMDT (message distribution) process 362, an HMRT (message routing) process 364, a link selection manager process 366, a linkset selector table 368, and a link selector table 370.

Layers 1 and 2 module 352 provides physical and data link layer functions for upper layer services. For example, layers 1 and 2 module 352 may implement a digital communication link that delivers bits over a physical medium. In addition, layers 1 and 2 module 352 may frame packets so that the receiver can recover the packets and can arrange for retransmission of packets.

Layers 3 and 4 module 354 provides network and transport layer services for incoming and outgoing packets. Exemplary network layer services that may be provided by layers 3 and 4 module 354 include routing packets from source to destination along a path that may comprise a number of links. Exemplary transport layer services that may be provided include message sequencing, timeouts, and retransmissions.

In addition to the conventional layers 3 and 4 functions, module 354 may translate between SS7 and IP address schemes. In order to perform such translation, layer 3 process 354 may utilize the procedures described in one or more of the existing standards for such conversions, such as that described in IETF Internet Draft draft-benedyk-sigtran-tali-01.txt, the disclosure of which is incorporated herein by reference in its entirety. Alternatively, such a mapping may be performed using the packet formats as described in RFC 2960: Stream Control Transmission Protocol, October 2000, the disclosure of which is incorporated herein by reference in its entirety.

I/O queue 358 provides for temporary buffering of incoming and outgoing IP signaling message packets. HMDC process 360 receives signaling message packets from the lower processing layers and performs a discrimination function, effectively determining whether an incoming IP message packet requires internal processing or is simply to be through switched. HMRT process 364 is adapted to receive and route messages from message discrimination process 360 that do not require further processing at the SG and are simply to be through switched. HMDT process 362 is adapted to facilitate the internal routing of IP message packets, received from message discrimination process 360, that do require additional SG based processing prior to final routing.

Link selection manager process 366 is adapted to perform a number of functions including the administration of routing data within the linkset and link selector tables 368 and 370, respectively. It will be appreciated that the linkset and link selector tables 368 and 370 are similar in structure and form to the corresponding LIM based databases illustrated in FIG. 7. As such, these linkset and link selector tables contain signaling route and signaling route status information, along with internal IMT bus routing instructions. LSM 360 is further adapted to notify other communication modules, generally within the SG, and coupled to IMT bus 320 of changes in the status of links and other nodes in both the SS7 and IP network components. In one embodiment of the present invention, LSM 360 is adapted to receive an IP-based TALI or SCTP network management (NM) message, use information contained within the NM message to update route status information in the linkset and link selector tables 368 and 370, respectively, and subsequently distribute the NM information to other communication modules connected to IMT bus 320.

It will be appreciated from FIG. 8 that layers 3 and 4 process 354 is further comprised of an inbound message manager process 372, an MTP primitive controller process 374, an outbound message manager process 376, a routing key database 378, and a socket database 380. An incoming IP message from IP network 278 is received by inbound message manager process 372 which subsequently examines the message packet and determines the appropriate response or processing action that is required. For instance, if the incoming IP signaling message packet is a call setup type message, the inbound message manager (IMM) process 372 may simply de-capsulate the SS7 portion of the message packet and subsequently pass the message to the I/O queue 358. If, however, the incoming IP signaling message packet is a network management information request or polling type message, IMM process 372 may extract relevant information from the message packet and consult MTP primitive controller process 374. MTP primitive controller process 374 examines the extracted information and generates an appropriate, related SS7 MTP message that can be routed to and interpreted by other SS7 nodes in an SS7 network. In some instances, the MTP primitive controller process 374 need not be consulted, and in such cases the IMM process 372 will respond directly. The particular response provided depends on the character of the original received IP network management message, and several such response scenarios will be discussed in more detail below.

Outbound message manager (OMM) process 376 is adapted to receive an outbound data packet from I/O queue 358 and begin the process of preparing the data packet for transmission into an IP network. As discussed above, exemplary packet structures that may be used to transmit IP messages over an IP network include TALI over TCP/IP or SCTP/IP. OMM process 360 receives a data packet from I/O queue 358 and, using information contained in the data packet, consults the routing key and socket tables 378 and 380, respectively, for appropriate routing address information.

FIG. 9 illustrates an example of routing key table 378. More particularly, sample routing key table 378 is comprised of multiple routing key fields including: an SS7 destination point code (DPC) 382, an SS7 origination point code (OPC) 384, a service indicator (SI) 386, a circuit identification code (CIC) 388, and a sub-system number (SSN) 390. Those skilled in the art of SS7 network operation will appreciate that such routing keys are commonly employed in SS7 routing nodes (i.e., STPs) to determine how and to where a signaling message packet should be routed. It will also be appreciated that many different combinations of signaling message parameters may be used to form a routing key, and as such, the particular structure presented in FIG. 9 is simply one of many possible routing key table structures.

Associated with each routing key record in the routing key table 378 is a socket identifier or pointer 392. This socket identifier is used to access data in the associated socket table 380, shown in FIG. 10. Referring to FIG. 10, socket table 380 includes information that defines a particular IP socket connection. More particularly, table 380 includes a socket identifier 394, and associated local IP addresses and port numbers 395 and distant IP addresses and port numbers 396. Socket table 380 also includes a socket status field 397, which contains availability status information related to each socket that is defined in the table.

Once again, it will be appreciated that the database structures and tables described above are merely illustrative of the types of data that can be employed to provide the functionality of an eDCM of the present invention.

SG Functionality Associated with an SS7 Node or Link Failure

Figure 11:
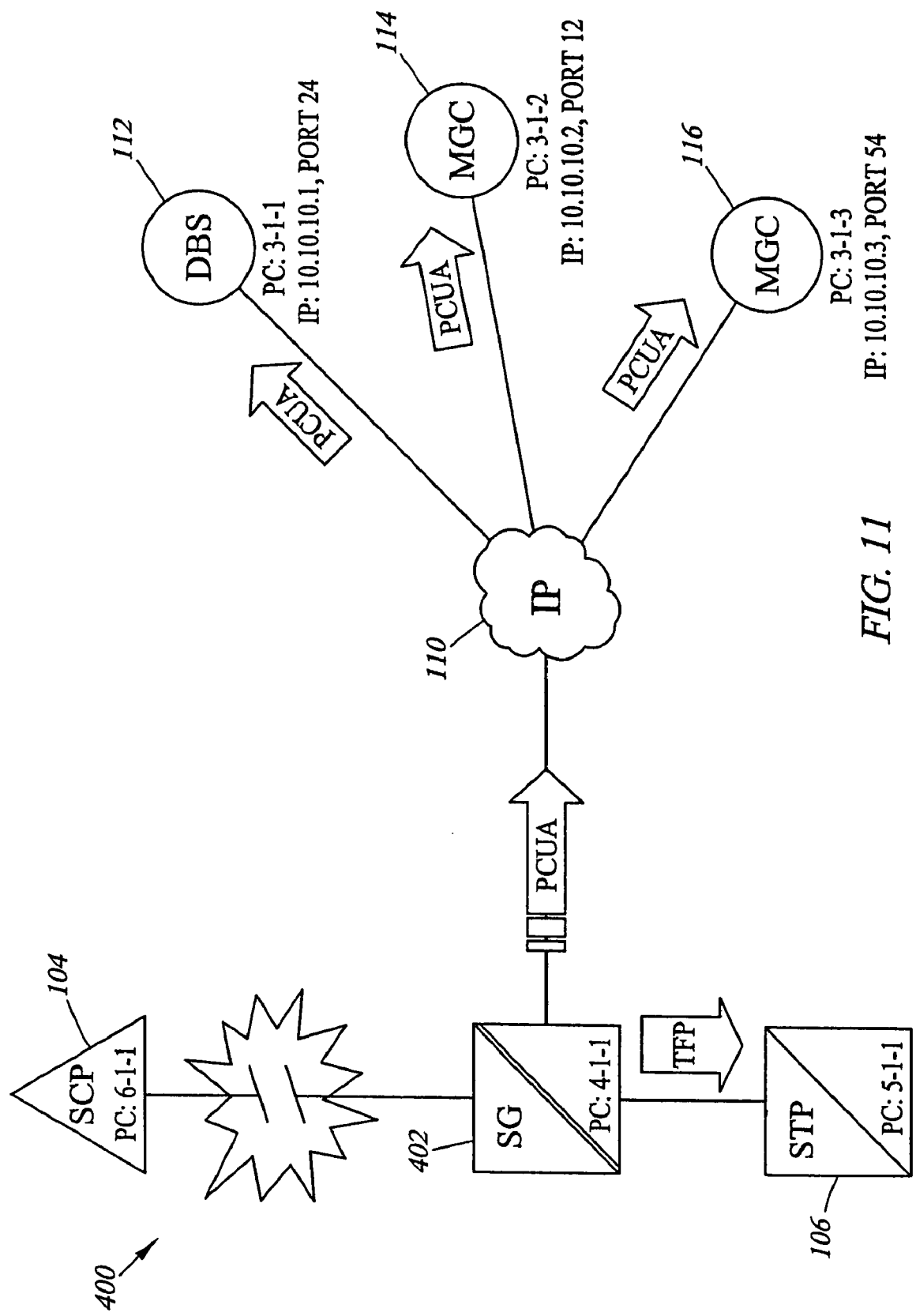
FIG. 11 is a network diagram that illustrates the flow of network management messages associated with an SS7 link failure episode according to an embodiment of the present invention.

Shown in FIG. 11 is a simplified converged SS7-IP communication network, generally indicated by the numeral 400. Network 400 is comprised of a number of SS7 network elements including a service control point (SCP) 104 and a signal transfer point (STP) 106. Converged network 400 also includes an IP network 110 and a number of IP connected network elements such as a database server node (DBS) 112, a first media gateway controller (MGC) 114, and a second MGC node 116.

As further indicated in FIG. 11, it will be appreciated that each of the SS7 network elements is assigned a unique SS7 address or point code (PC), such that SCP 104 is identified in the SS7 network as PC=6-1-1, STP 106 is identified as PC=5-1-1. In a similar manner, each IP network element is assigned a unique IP address, such that DBS node 112 is identified in the IP network as IP=10.10.10.1: Port 24, MGC 114 is identified as IP=10.10.10.2: Port 12, and MGC 116 is identified as IP=10.10.10.3: Port 54. In the converged network environment, it will be further appreciated that each IP network element is assigned an SS7 network address or alias, such that DBS node 112 is also identified by the SS7 point code PC=3-1-1, MGC 114 is identified by PC=3-1-2, and MGC 116 is identified by PC=3-1-3.

Also included in converged network 400 is a signaling gateway (SG) routing node 402 of the present invention. As such, it will be appreciated that SG 402 includes both LIM and eDCM communication modules, as described above. In the simplified network diagram shown in FIG. 11, SG 402 communicates with adjacent SS7 STP node 106 via a single SS7 signaling link. SG 402 communicates with IP DBS node 112, IP MGC node 114, and IP MGC node 116 via a plurality of IP sockets. Furthermore, in the examples discussed herein, it is assumed that SG 402 and the IP nodes connected thereto all implement an appropriate stream-oriented communication protocol, such as TALI over TCP/IP or SCTP/IP. Again, it will be appreciated that a number of functionally similar protocols that provide reliable, stream-oriented communication could also be employed by the SG and IP nodes to facilitate communication.

The particular scenario presented in FIG. 11 corresponds to the case where a node in an SS7 network fails or becomes inaccessible. Such a situation may arise from one or more signaling link failures or possibly a higher level failure within the node. In any event, in the example shown in FIG. 11, SCP node 104 is assumed to experience a signaling link failure that effectively isolates the node from all other elements in the converged network. Upon determination that SCP node 104 is unavailable, SG 402 generates an SS7 transfer prohibited (TFP) network management message and subsequently sends copies of the TFP message to other SS7 nodes in the network. In this particular example, STP 106 is notified of the problem with SCP node 104 via the TFP message. Once notified and made aware of the unavailable status of SCP 104, SS7 nodes will not attempt to route SS7 signaling messages to SCP 104 until such time as they are again notified by SG 402 that SCP 104 has recovered.

Prior to SG 402 according to an embodiment of the present invention, an efficient and effective technique whereby IP nodes in the converged network could take advantage of network management information generated within the SS7 component of a converged network environment did not exist. It is at this point that one of the significant advantages of the present invention will be appreciated. More particularly, it will be appreciated from the message flows illustrated in FIG. 11 that SG 402 is adapted to generate a related, IP-formatted, TALI- or SCTP-based point code unavailable (PCUA) message that is effectively and efficiently distributed to relevant nodes in the IP component of the converged network environment. As such, SG 402 of the present invention is capable of generating and distributing a plurality of IP network management messages that are associated with or analogous to an SS7 network management message (e.g., a TFP message).

Upon receipt of a TALI PCUA message, DBS node 112, MGC node 114, and MGC node 116 are effectively notified of the SS7 network difficulty and further transmission of IP originated signaling messages that would be destined for SCP 104 is halted.

eDCM Response to an SS7 TFP Network Management Message

Figure 12:
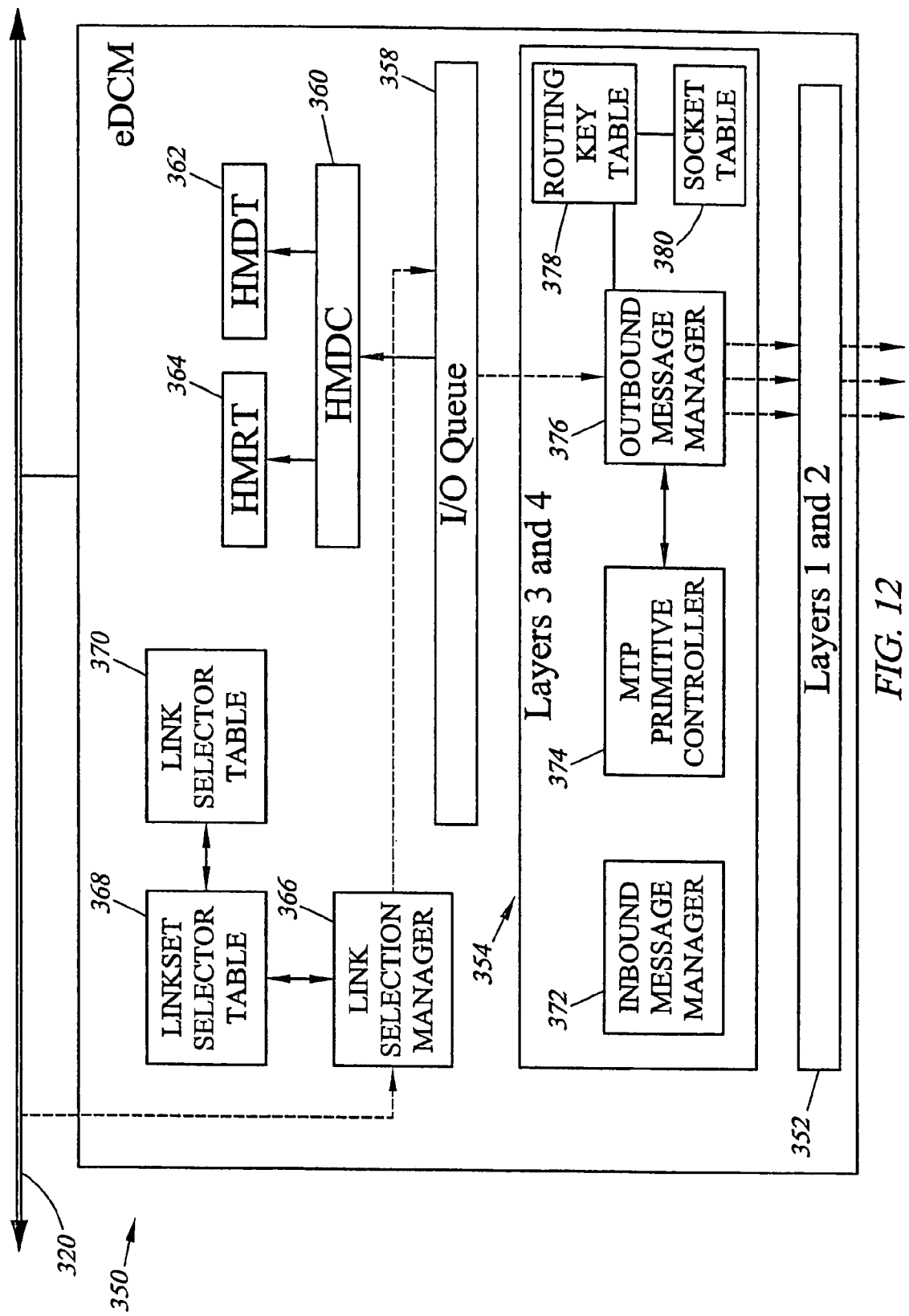
FIG. 12 is a schematic diagram of an eDCM including internal message flows associated with an SS7 link failure episode according to an embodiment of the present invention.

FIG. 12 illustrates eDCM communication module 350 and relevant message flows associated with the SS7 node or link failure discussed above and generally illustrated in FIG. 11. For the purposes of example, it is assumed that the SS7 TFP network management message is generated at SG 402 by the SS7 link interface module 300 (illustrated in FIG. 6). TFP message creation and subsequent distribution is performed by one or more MTP level 3 processes. In any event, a TFP message is generated and route availability information is updated in linkset and link selector tables 316 and 318, respectively. More particularly, route status information associated with failed SCP node 104 needs to be updated to reflect the SCP node's unavailable state. As such, LSM 314 facilitates the updating of linkset and link selector tables 316 and 318, respectively.

HMDT process 312 determines that other communication modules connected to IMT bus 320 also need to update their local linkset and link selector tables, and consequently distributes copies of the TFP network management message to other communication modules in the SG via IMT bus 320.

Returning to FIG. 12, it will be appreciated that a copy of the TFP network management message or at least a portion of the information originally contained therein is received at eDCM 350 via IMT bus 320. More particularly, the TFP message is received by the local eDCM link selection manager (LSM) process 366, which in turn uses the network management information to update route and link status information contained in linkset and link selector databases 368 and 370, respectively. LSM 390 forwards the TFP message to MTP primitive controller 374 and OMM 376 processes which determine, based on information contained in the routing key and socket tables 378 and 380, respectively, that there are several provisioned IP communication links which have the capability of receiving IP node originated signaling messages that might be destined for the failed SCP node 104. In the example shown in FIG. 11, the affected IP nodes include DBS node 112, MGC node 114, and MGC node 116. Consequently, these IP nodes need to be notified of the unavailable status of SCP node 104.

It will be appreciated that information may be stored in the routing key and socket databases that indicate whether a particular IP node prefers to receive broadcast type network management messages or instead to receive network management messages associated with a more selective response method. In the event that a network management (NM) message requiring broadcast distribution is received by SG 402, all concerned nodes or point codes that are configured to accept broadcast type messages will receive the NM message, such as generally indicated in FIG. 11.

Figure 13:
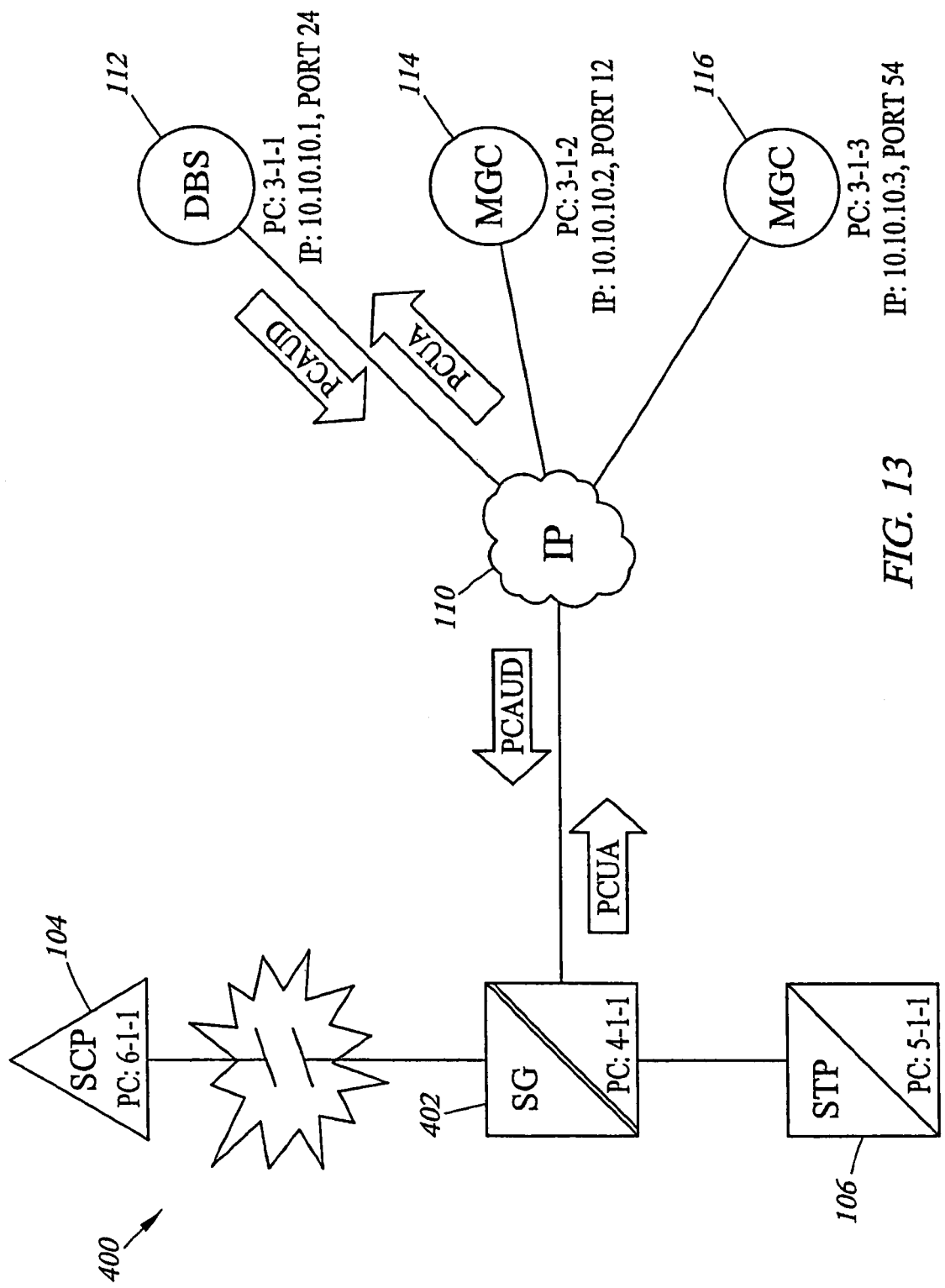
FIG. 13 is a network diagram that illustrates message flows associated with a point code availability poll that is initiated by an IP node according to an embodiment of the present invention.

In the event that a NM message is received by SG 402 that does not require broadcast distribution, a more selective response method may be employed. For example, a NM message could be received by SG 402 which does not require broadcast distribution and which is specifically addressed to PC=3-1-1, the point code of DBS node 112. In such a case, the NM message may be selectively distributed to DBS node 112, as shown in FIG. 13. As multiple sockets may be aliased to a single SS7 point code, it will be appreciated that in certain instances, a selective response method of the present invention may result in the distribution of a NM message to multiple IP nodes which all share the same SS7 point code address. In any event, the present invention is adapted to accommodate both broadcast and selective response type methods.

As such, LSM 366 passes the TFP network management message to the outbound message manager (OMM) process 376, via I/O queue 358. Using information contained in the TFP message, OMM 376 consults MTP primitive controller process 374 in order to formulate a IP-based network management message that is equivalent or related to the original SS7 TFP network management message. Once again, in this embodiment, the IP-based network management protocol may be TALI or SCTP. However, any stream-oriented mechanism for reliably transporting SS7 messages over an IP network may be employed.

MTP primitive controller process 372 returns an IP-based TALI or SCTP point code unavailable (PCUA) network management message to OMM 376. In response, OMM 376 consults the routing key and socket tables 378 and 380, respectively, to determine the particular socket or sockets over which the PCUA message should be transmitted. In the example routing key table 378 shown in FIG. 9, there are three IP sockets that support communication with SCP node 104. These sockets are identified as sock1, sock2, and sock3. Consequently, OMM process 376 replicates the PCUA message so as to effectively produce one copy of the PCUA message for each of the three sockets. Each copy of the PCUA message is appropriately addressed, using IP address and TCP port information returned by the socket table 380. The three PCUA messages are subsequently passed through layers 1 and 2 processing and transmitted into the IP network 110 where they are eventually received by the three IP nodes: DBS 112, MGC 114, and MGC 116. Again, it will be appreciated that upon receipt of a PCUA message, each of the above mentioned IP nodes is made aware of the SCP 104 node or link failure, and further transmission of signaling messages from these IP nodes to SCP 104 is halted. As such SS7 network management information has effectively been communicated to and acted upon by nodes in an IP network.

SG Functionality Associated with IP Availability Pollinq

Continuing with the failed SS7 node scenario presented in FIG. 11 and discussed in detail above, FIG. 13 illustrates a subsequent attempt by IP-based DBS node 112 to obtain information regarding the availability status of the failed SS7 SCP node 104.

More particularly, it will be appreciated from the message flows illustrated in FIG. 13 that DBS node 112 is adapted to periodically poll the SS7 network component of the converged network 400 regarding the availability status of SCP 104. In the embodiment illustrated, such availability status polling may be accomplished or facilitated via a point code availability audit (PCAUD) TALI- or SCTP-formatted message.

As indicated in FIG. 13, DBS node 112 generates and transmits a PCAUD message into IP network 110. The PCAUD message is received and subsequently processed by SG 402. In the particular example shown in FIG. 13, it is assumed that SCP 104 continues to be unavailable for service and SG 402 consequently responds with a TALI or SCTP point code unavailable (PCUA) message. It will be appreciated that STP 106, which is the routing node immediately adjacent the failed SCP 104, is not consulted for SCP 104 status. SG 402 of the present invention is adapted to utilize on-board route status information when generating a response to a PCAUD or similar type availability status poll from an IP-based node. As indicated in FIG. 13, it will also be appreciated that SG 402 responds with a single PCUA message that is sent to the PCAUD message originator over the socket through which the PCAUD message was received.

Figure 14:
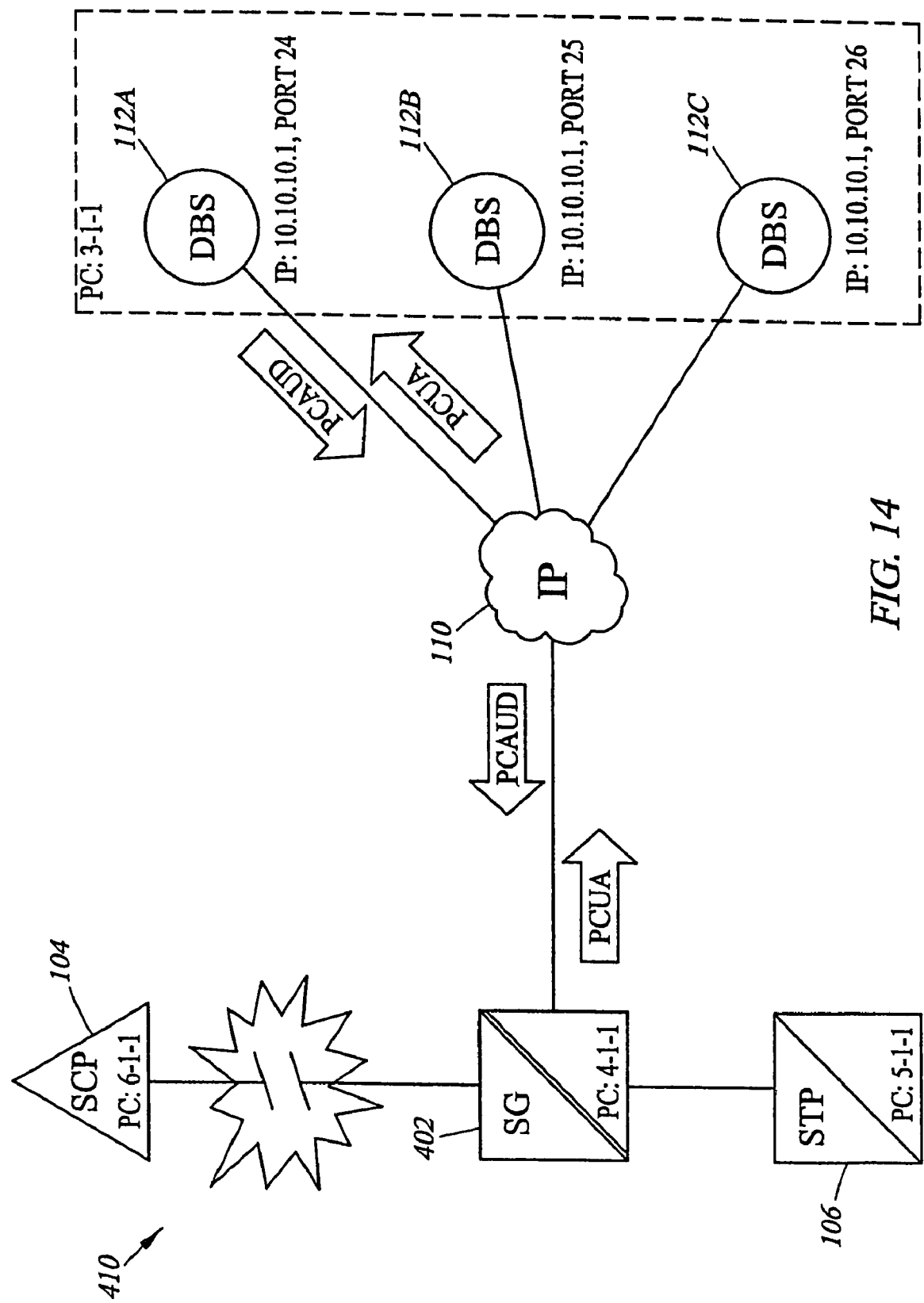
FIG. 14 is a network diagram that illustrates message flows associated with a point code availability poll that is initiated by one of many IP nodes that are aliased to the same SS7 point code according to an embodiment of the present invention.

It will be appreciated that multiple IP nodes and/or socket connections may be aliased to the same SS7 point code in a converged network environment, as described in commonly-assigned, co-pending International Patent Publication No. WO 00/60812, the disclosure of which is incorporated herein by reference in its entirety. Such a scenario is generally illustrated in FIG. 14, and it will be appreciated that in such an aliasing configuration SG 402 is adapted to respond only to the specific DBS node that originated the PCAUD polling message. By doing so, network management signaling traffic within IP network 110 is kept to a minimum, thereby avoiding congestive conditions within the IP network. If a converged network operator were so inclined, however, SG 402 could be configured to respond to all of the IP nodes (i.e., DBS nodes 112a, 112b, and 112c) that are aliased to the SS7 point code 3-1-1.

eDCM Functionality Related to IP Availability Polling

Figure 15:
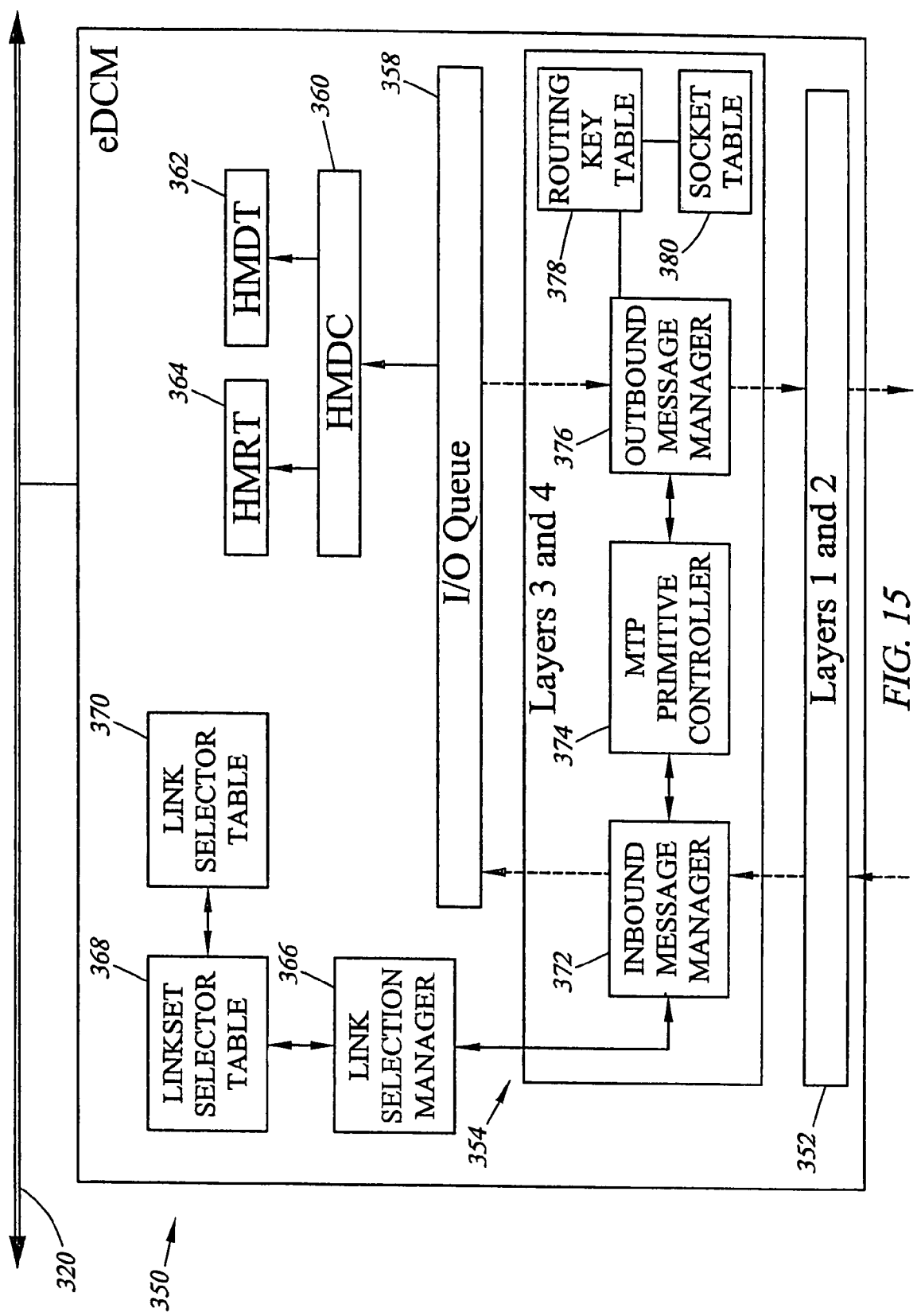
FIG. 15 is a schematic diagram of an eDCM including internal message flows associated with a point code availability poll that is initiated by an IP node according to an embodiment of the present invention.

FIG. 15 illustrates eDCM communication module 350, and relevant message flows associated with the SS7 node availability poll discussed above and generally illustrated in FIGS. 13 and 14. For the purposes of example, it is assumed that the SS7 PCAUD network management message is received at SG 402 by eDCM communication module 350. As in previous figures, the dashed lines represent routing of the inbound messages, while the solid lines represent communication between processes. As generally indicated in FIG. 15, the PCAUD message is received via IP layers 1 and 2 process 352, and is subsequently processed and directed to IP layers 3 and 4 process 354.

Within layers 3 and 4 process 354, the PCAUD message is received by inbound message manager (IMM) process 372. In one embodiment, IMM process 372 consults linkset selection manager (LSM) process 366, which examines information contained in the received PCAUD network management message and determines the availability status of the SS7 node in question. This SS7 point code availability status determination is facilitated by SS7 point code/route status information that is maintained in link selector table 370.

For the purposes of this example, it is assumed that the point code/route status information returned by LSM process 366 indicates that SCP node 104 is still unavailable. This status information is returned to IMM process 372 which subsequently generates a TALI PCUA network management response message and passes this message to outbound message manager (OMM) process 376 via I/O queue 358. It will be appreciated that in this case, information identifying the originating socket over which the PCAUD message was received is placed in the PCUA message packet by IMM process 372. Consequently, OMM process 376 need not necessarily consult the routing key and socket databases 378 and 380, respectively, to determine the particular IP socket or sockets over which the PCUA message should be transmitted. Instead the PCUA message packet is passed to layers 1 and 2 352 and subsequently transmitted to and received by DBS node 112, as shown in FIG. 13.

Again, it will be appreciated that upon receipt of a PCUA message, DBS node 112 is again made aware of the continuing SCP 104 node or link failure, and transmission of signaling messages from this IP node to SCP 104 remains suspended.

SG Functionality Related to IP Congestion Poll Filtering

Figure 16:
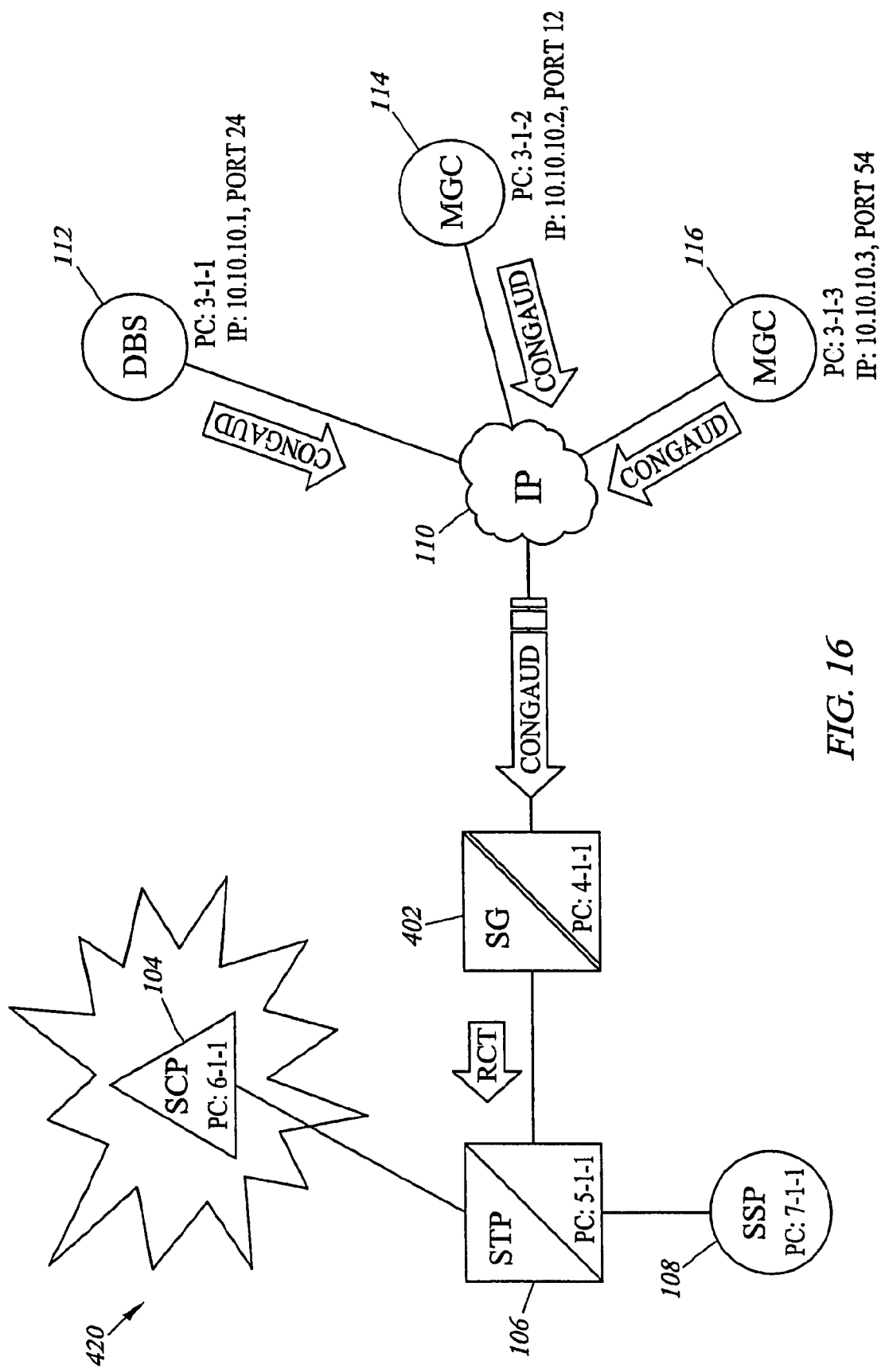
FIG. 16 is a network diagram that illustrates message flows associated with simultaneous point code congestion polls that are initiated by multiple IP nodes according to an embodiment of the present invention.

Shown in FIG. 16 is a converged network scenario that involves an SS7 node that is in a congested state. More particularly, converged network 420 includes SCP node 104 that is experiencing congestion, possibly due to an abnormally high volume of signaling traffic across the SS7 communication link that connects the node to STP 106. It will be appreciated that upon receipt of an MSU destined for the congested SCP 104, STP 106 would typically generate an SS7 transfer controlled (TFC) network management message and subsequently notifies the MSU originator of the congested status of SCP 104. It should also be appreciated that this initial SS7 TFC network management message is not broadcast to all concerned IP nodes in a manner analogous to that described above for TFP type messages. With TFC type congestion NM messages, more selective response methods may be employed by SG 402.

Subsequent to the initial TFC notification, an affected IP node is adapted to periodically poll the congested SS7 node in an attempt to determine when the congestion has abated, and normal routing can resume. The particular example scenario illustrated in FIG. 16 involves the simultaneous or near simultaneous polling by the three IP nodes: DBS 112; MGC 114; and MGC 116. Once again, assuming that a TALI or SCTP signaling protocol is employed, the IP node generated polling messages are in the form of a congestion status audit (CONGAUD) type network management message. As indicated in FIG. 16, while all three independently generated CONGAUD messages are received at SG 402 simultaneously or nearly simultaneously, only one SS7 route set congestion test (RCT) message is generated by SG 402 and subsequently routed to STP 106. As such, SG 402 effectively filters redundant congestion status polls received from the IP network 110, and consequently reduces congestion on the SS7 signaling link that connects SG 402 and STP 106.

With regard to eDCM operation in such a scenario, it will be appreciated that in one embodiment such filtering is accomplished by an inbound message manger (IMM) process which is similar to the IMM processes previously disclosed herein. More particularly, an eDCM based IMM process is adapted to utilize a timer such that only a single CONGAUD message related to a specific SS7 node is conveyed through to the SS7 network in a pre-determined time period. A CONGAUD message that satisfies the time-filter criteria would be processed by an MTP primitive controller similar to those discussed previously, which would produce an equivalent, related SS7 RCT network management message. In a manner similar to those already described in detail herein, the SS7 RCT message would be internally routed within the SG to an appropriate LIM module via an IMT bus, where the RCT message would be transmitted to STP 106.

SG Functionality Related to Congestion Response Message Distribution

Figure 17:
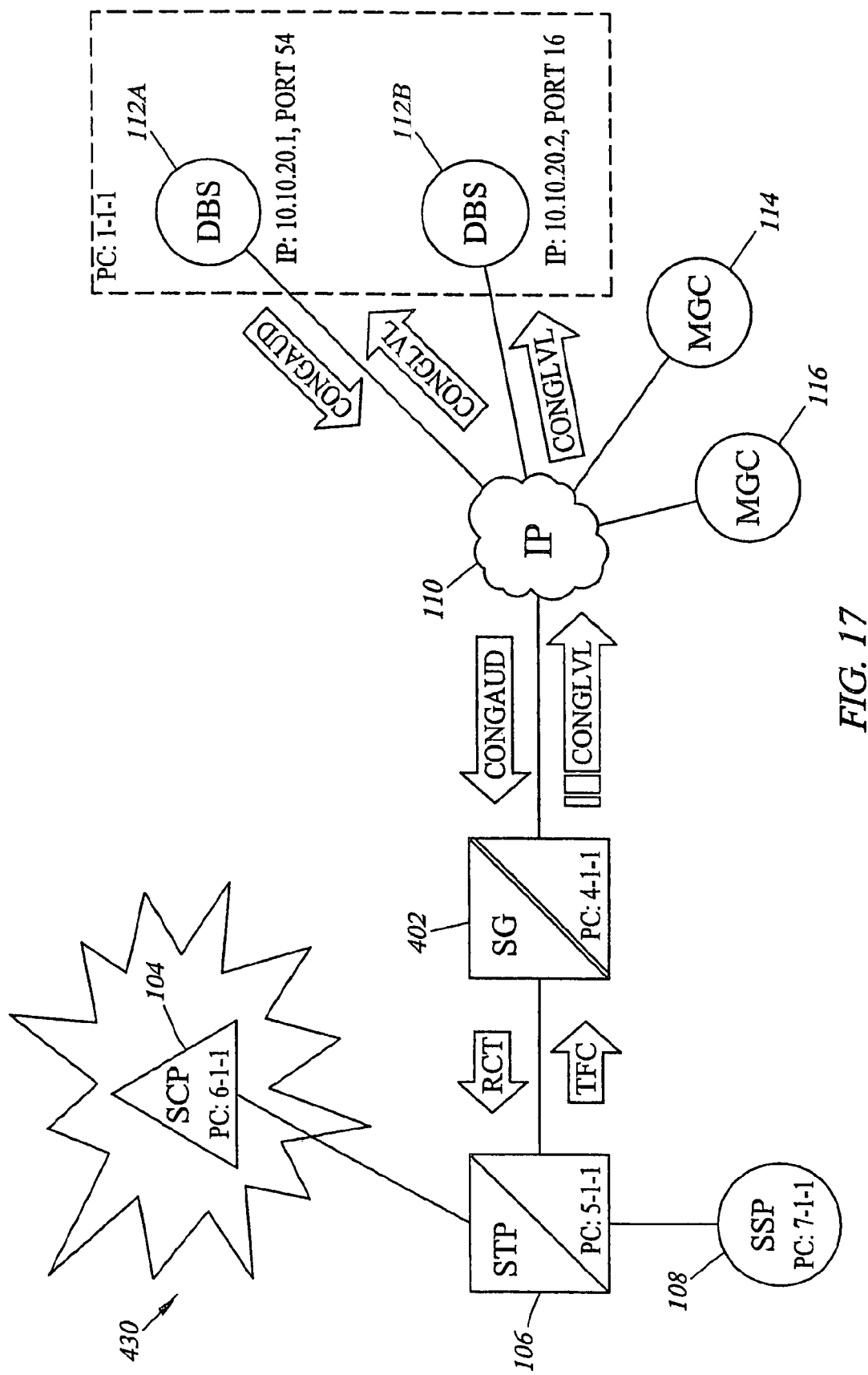
FIG. 17 is a network diagram that illustrates message flows associated with a point code congestion poll and subsequent distribution of a congestion response message according to an embodiment of the present invention.

Shown in FIG. 17 is a converged network scenario that is related to that presented in FIG. 16 and discussed in detail above. Once again, converged network 430 includes SCP node 104 that is experiencing congestion, possibly due to an abnormally high volume of signaling traffic across the SS7 communication link that connects the node to STP 106. As discussed previously, STP 106 would have previously generated an initial SS7 transfer controlled (TFC) network management message and subsequently notified the DBS nodes corresponding to SS7 PC=1-1-1 (i.e., nodes 112a and 112b) of the congested status of SCP 104.

Subsequent to the initial TFC notification, the two affected IP nodes are adapted to periodically poll the congested SS7 node in an attempt to determine if the congestion at SCP 104 has abated, and normal routing can resume. The particular example scenario illustrated in FIG. 17 involves a congestion status audit (CONGAUD) network management message that is originated by IP based DBS node 112a. As indicated in FIG. 17, the CONGAUD message is received at SG 402 and an SS7 route set congestion test (RCT) message is subsequently generated at SG 402 in a manner similar to that previously described. The RCT message is routed to STP 106, which determines that SCP 104 is still congested and subsequently responds to SG 402 with a TFC network management message that effectively confirms the congested status of SCP node 104.

In much the same manner as the TFP message in the example scenario presented in FIG. 11 and described in detail above, the TFC message is received by a LIM in the SG 402 and subsequently routed internally via an IMT bus to an eDCM communication module. Again, at the eDCM module, the SS7 TFC network management message flow is similar to that generally illustrated in FIG. 12.

As such, it will be appreciated that a copy of the TFC network management message or at least a portion of the information originally contained therein is received at eDCM 350 via IMT bus 320. MTP primitive controller 358 and OMM 360 determine, based on the information contained in the routing key and socket databases 362 and 364, respectively, that there are two provisioned IP communication sockets which are aliased to the point code (i.e., PC=1-1-1) that generated the original congestion audit NM message. In the example shown in FIG. 17, the concerned IP nodes include DBS nodes 112a and 112b.

Returning to the discussion of eDCM operation, as indicated in FIG. 12, LSM 390 passes the TFC network management message to the outbound message manager (OMM) process 360, via I/O queue 376. Using information contained in the TFC message, OMM 360 consults MTP primitive controller process 358 in order to formulate a IP-based network management message that is equivalent or related to the original SS7 TFC network management message. Once again, in this embodiment, it is assumed that the IP-based network management protocol is TALI- or SCTP-based. However, other reliable stream-oriented procedures may be used. In addition, any application layer protocol, such as SIP, may be used to communicate with the IP nodes.

MTP primitive controller process 358 returns an IP-based TALI point code congested (CONGLVL) network management message to OMM 360. It will be appreciated that a CONGLVL type congestion message may include information that indicates the degree or level of congestion. In any event, OMM 360 subsequently consults the routing key and socket databases 362 and 364, respectively, to determine the particular socket or sockets over which the CONGLVL message should be transmitted. In the example routing key table 362 shown in FIG. 9, there are two sockets that support communication with SCP node 104. These sockets are identified as sock4, and sock5. Consequently, OMM process 360 replicates the CONGLVL message so as to effectively produce one copy of the CONGLVL message for each of the two sockets. Each copy of the CONGLVL message is appropriately addressed, using IP address and TCP port information returned by the socket database process 364. The two CONGLVL messages are subsequently passed through IP level 1 processing and transmitted into the IP network 110 where they are eventually received by the two IP nodes: DBS 112a and 112b. Again, it will be appreciated that upon receipt of a CONGLVL message, each of the above mentioned IP nodes is made aware of the congested status of SCP 104 node so that alternate routes may be employed, if possible. It will be appreciated that MGC node 114 and MGC node 116 do not receive copies of the congestion response message, as they are not associated with the PC 1-1-1.

Again, it should be noted that other signaling protocols and network management messages may be employed within the context of the present invention. Those skilled in the art of SS7 telecommunication networks will appreciate that functionality similar to that described above could be implement at a cluster routing level. Such a cluster routing scenario would involve different SS7 MTP network management messages and their corresponding TALI or SCTP equivalents, however the basic processing within a SG of the present invention would be similar. Again, it is the ability to effectively and efficiently communicate network management type information between different network components in a converged network environment that is key to the present invention. It will also be appreciated that various details of the invention may be changed without departing from the scope of the invention. Furthermore, the foregoing description is for the purpose of illustration only, and not for the purpose of limitation—the invention being defined by the claims.

It will be understood that various details of the presently disclosed subject matter may be changed without departing from the scope of the presently disclosed subject matter. Furthermore, the foregoing description is for the purpose of illustration only, and not for the purpose of limitation.

What is claimed is:

1. A method for use at a gateway node in a converged telephony/data network for distributing operating status information associated with a node in a signaling system 7 (SS7) network of the converged network to nodes in an Internet protocol (IP) network of the converged network, the method comprising:
   (a) receiving, at a gateway node, an SS7 network management message including operating status information associated with an SS7 node in the SS7 network;
   (b) performing, at the gateway node, a routing key database lookup using information contained in the SS7 network management message and identifying a node in the IP network capable of communicating with the SS7 node; and
   (c) in response to receiving the SS7 network management message and identifying the node in the IP network via the routing key database lookup, communicating, from the gateway node, the operating status information to the identified node in the IP network, wherein the identified node is located external to the gateway node.

2. The method of claim 1 wherein communicating the operating status information to an IP node in an IP network includes communicating the operating status information in a transport adapter layer interface (TALI) message.

3. The method of claim 1 wherein communicating the operating status information to an IP node in the IP network includes communicating the operating status information in a stream control transmission protocol (SCTP) message.

4. The method of claim 1 wherein communicating the operating status information to an IP node in the IP network includes communicating a point code unavailable (PCUA) message.

5. The method of claim 1 wherein communicating the operating status information to an IP node in the IP network includes communicating a point code available (PCAV) message.

6. The method of claim 1 comprising receiving a point code status audit message for requesting point code status information for the SS7 node from a node in the IP network, and, in response to the request, communicating the point code status information to the requesting node.

7. The method of claim 1 comprising receiving a point code congestion audit message from a node in the data network, the point code congestion audit message requesting point code congestion for the SS7 node and, in response to the congestion audit message, sending the point code congestion information to the requesting node.

8. The method of claim 1 wherein communicating the operating status information includes communicating a session initiation protocol (SIP) message.

9. The method of claim 1 wherein receiving an SS7 network management message includes receiving a transfer prohibited (TFP) message.

10. The method of claim 1 wherein receiving an SS7 network management message includes receiving a transfer allowed (TFA) message.

11. The method of claim 1 wherein receiving an SS7 network management message includes receiving a transfer restricted (TFR) message.

12. The method of claim 1 wherein receiving an SS7 network management message includes receiving a transfer controlled (TFC) message.

13. The method of claim 1 wherein performing a routing key database lookup using information contained in the SS7 network management message includes performing a routing key database lookup using an SS7 destination point code (DPC) value extracted from the SS7 network management message.

14. The method of claim 1 wherein performing a routing key database lookup using information contained in the SS7 network management message includes performing a routing key database lookup using an SS7 origination point code (OPC) value extracted from the SS7 network management message.

15. The method of claim 1 wherein performing a routing key database lookup using information contained in the SS7 network management message includes performing a routing key database lookup using an SS7 service indicator (SI) value extracted from the SS7 network management message.

16. The method of claim 1 wherein performing a routing key database lookup using information contained in the SS7 network management message includes performing a routing key database lookup using an SS7 circuit identification code (CIC) value extracted from the SS7 network management message.

17. The method of claim 1 wherein performing a routing key database lookup using information contained in the SS7 network management message includes performing a routing key database lookup using an SS7 subsystem (SSN) value extracted from the SS7 network management message.

18. The method of claim 1 wherein identifying a node in the data network capable of communicating with the SS7 node includes identifying a socket associated with the node in the data network.

19. A signaling gateway comprising:
(a) a routing key table for storing routing key information for identifying IP nodes in an IP network that are configured to communicate with an SS7 node in an SS7 network;
(b) a status manager process for determining or receiving status information relating to the SS7 node; and
(c) a communications module operatively associated with the routing key table and the status manager process for communicating, in response to receiving the status information and identifying the IP nodes in the routing key table, the status information to the identified IP nodes, wherein the identified IP nodes are located external to the signaling gateway and configured to communicate with the SS7 node using the routing key information.

* * * * *